United States Patent
Kawamura et al.

(10) Patent No.: US 7,469,327 B2
(45) Date of Patent: Dec. 23, 2008

(54) SYSTEM AND METHOD FOR RESTRICTING ACCESS TO LOGICAL VOLUMES

(75) Inventors: Shunji Kawamura, Yokohama (JP); Hisao Homma, Odawara (JP); Yasuyuki Nagasoe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 11/038,044

(22) Filed: Jan. 21, 2005

(65) Prior Publication Data

US 2006/0095688 A1    May 4, 2006

(30) Foreign Application Priority Data

Oct. 28, 2004    (JP) .............................. 2004-313874

(51) Int. Cl.
G06F 12/00    (2006.01)
G06F 13/00    (2006.01)
G06F 13/28    (2006.01)

(52) U.S. Cl. .................. 711/163; 711/152; 711/170; 711/173

(58) Field of Classification Search .............. 711/152, 711/163
See application file for complete search history.

(56) References Cited

U.S. PATENT DOCUMENTS

| | | | |
|---|---|---|---|
| 6,041,394 A * | 3/2000 | Halligan et al. ............. | 711/166 |
| 6,185,661 B1 | 2/2001 | Ofek et al. | |
| 6,658,417 B1 | 12/2003 | Stakutis et al. | |
| 7,130,971 B2 * | 10/2006 | Kitamura ..................... | 711/154 |
| 7,203,808 B2 * | 4/2007 | Rothman et al. ............ | 711/163 |
| 2003/0140210 A1 | 7/2003 | Testardi | |
| 2004/0186858 A1 | 9/2004 | McGovern et al. | |
| 2005/0097260 A1 * | 5/2005 | McGovern et al. .......... | 711/100 |
| 2006/0010301 A1 * | 1/2006 | Yagawa ...................... | 711/163 |

FOREIGN PATENT DOCUMENTS

JP    2000-112822    4/2000

OTHER PUBLICATIONS

"Solstice DiskSuite / Solaris Volume Manager—Soft Partitioning", 'Online', Aug. 22, 2001, pp. 1-10.

* cited by examiner

Primary Examiner—Kevin L Ellis
Assistant Examiner—Ryan Bertram
(74) Attorney, Agent, or Firm—Mattingly, Stanger, Malur & Brundidge, PC

(57) ABSTRACT

A storage system is utilized to its fullest storage capacity by setting a write inhibitive attribute to a desired storage area of the storage system. The storage system has a logical volume in which data is stored and a control device which controls access to the data stored in the logical volume. A first area of a desired size is set in the logical volume, and an access control attribute is set to the first area. In response to a request made by a computer to perform access to the logical volume, the control device notifies the computer that the control device does not perform the access when an area designated by the access request contains at least a part of the first area and the access control attribute set to the first area inhibits the type of the access requested.

22 Claims, 21 Drawing Sheets

VOLUME MANAGEMENT INFORMATION

| ITEM | CONTENT |
|---|---|
| 401 ~ TOTAL SIZE | OVERALL SIZE OF LOGICAL DEVICE INCLUDING VMA AND USER AREA |
| 402 ~ VMA TYPE | USES OF VMA |
| 403 ~ VMA SIZE | SIZE OF VMA |

EXTENT MANAGEMENT INFORMATION

| | ACCESS LEVEL | WRITE INHIBITIVE FLAG | READ INHIBITIVE FLAG | CONTENT |
|---|---|---|---|---|
| 701 | NORMAL MODE | 0 | 0 | READ/WRITE ALLOWED |
| 702 | READ-ONLY MODE | 1 | 0 | READ ALLOWED, WRITE INHIBITED |
| 703 | WRITE-ONLY MODE | 0 | 1 | WRITE ALLOWED, READ INHIBITED |
| 704 | READ/WRITE INHIBITIVE MODE | 1 | 1 | READ/WRITE INHIBITED |

| | STATUS FLAG | | | | PROCESSING EXECUTABILITY JUDGMENT | | | |
|---|---|---|---|---|---|---|---|---|
| | CONTAINING EXTENT | CONTAINING END | CONTAINING WRITE INHIBITED AREA | CONTAINING READ INHIBITED AREA | CREATION OF NEW EXTENT | | WRITE | READ |
| | | | | | END MANAGEMENT BLOCK | MIDDLE MANAGEMENT BLOCK | | |
| 921 | 1 | 0 | 0 | 0 | NG | NG | OK | OK |
| 922 | 1 | 1 | 0 | 0 | DETAILED JUDGING | NG | OK | OK |
| 923 | 1 | 1 | 1 | 0 | DETAILED JUDGING | NG | DETAILED JUDGING | OK |
| 924 | 1 | 0 | 0 | 0 | NG | NG | NG | OK |
| 925 | 0 | 0 | 0 | 0 | OK | OK | OK | OK |
| 926 | 0 | 1 | 1 | 0 | NO COMBINATION IS PRESENT | | | |
| 927 | 0 | 0 | 1 | 0 | | | | |
| 928 | 0 | 0 | 0 | 1 | | | | |
| 929 | 1 | 1 | 0 | 1 | NG | NG | OK | NG |
| 930 | 1 | 1 | 0 | 1 | DETAILED JUDGING | NG | OK | DETAILED JUDGING |
| 931 | 1 | 1 | 1 | 1 | DETAILED JUDGING | NG | DETAILED JUDGING | DETAILED JUDGING |
| 932 | 1 | 0 | 0 | 1 | NG | NG | NG | NG |
| 933 | 0 | 0 | 0 | 1 | NO COMBINATION IS PRESENT | | | |
| 934 | 0 | 1 | 1 | 1 | | | | |
| 935 | 0 | 1 | 1 | 1 | | | | |
| 936 | 0 | 0 | 1 | 1 | | | | |

SYSTEM AND METHOD FOR RESTRICTING ACCESS TO LOGICAL VOLUMES

CLAIM OF PRIORITY

The present application claims priority from Japanese application P2004-313874 filed on Oct. 28, 2004, the content of which is hereby incorporated by reference into this application.

BACKGROUND

This invention relates to access control for a storage system.

JP 2000-112822 A is an example of prior art in the field of access control technique for controlling access to a logical volume in a storage system from a host computer, in particular, a data security function of a logical volume. In JP 2000-112822 A, one of three attributes, one which allows read and write both, one which inhibits write, and one which inhibits read and write both, is set to each logical volume in a storage system. A read/write command from a computer is processed based on the attribute set to the logical volume where data is to be read or written.

SUMMARY

According to JP 2000-112822 A, the attribute such as a write inhibitive attribute is set to the entire logical volume. In order to prevent data in a logical volume from being updated, a write inhibitive attribute has to be set to the entire logical volume even when the logical volume still has free areas left. This makes the free areas of the logical volume unavailable for data write, with the result that the storage system cannot be utilized to its fullest capacity.

In one embodiments of the invention, a storage system coupled to a computer via a network, comprising: a logical volume in which data is stored; and a control device which controls access to the data stored in the logical volume, wherein a first area of a desired size is set in the logical volume, the first area having an access control attribute set thereto, and wherein, upon receiving an access request made by the computer to perform access to the logical volume, the control device notifies the computer that the control device does not perform the access when an area designated by the access request contains at least a part of the first area and the access control attribute set to the first area inhibits the type of the access requested, is provided.

Therefore, it is possible to set areas (extents) of a desired size in a logical volume and set an attribute, such as a write inhibitive attribute, to each extent separately. A storage system can thus be utilized to its fullest capacity.

BRIEF DESCRIPTION OF THE DRAWINGS

FIG. 4 is an explanatory diagram of volume management information according to the embodiment of this invention.

FIG. 7 is an explanatory diagram showing the association between an attribute set to an extent and the type of access allowed for the extent in the embodiment of this invention.

FIG. 9 is an explanatory diagram showing the relation between a status flag of a management block and a judgment about what type of processing is allowed and what type is not.

DETAILED DESCRIPTION OF THE PREFERRED EMBODIMENT

An embodiment of this invention will be described below with reference to the accompanying drawings. This embodiment is an example of applying the invention to management of e-mail data. It should be noted that this invention is also applicable to other uses.

Figure 1:
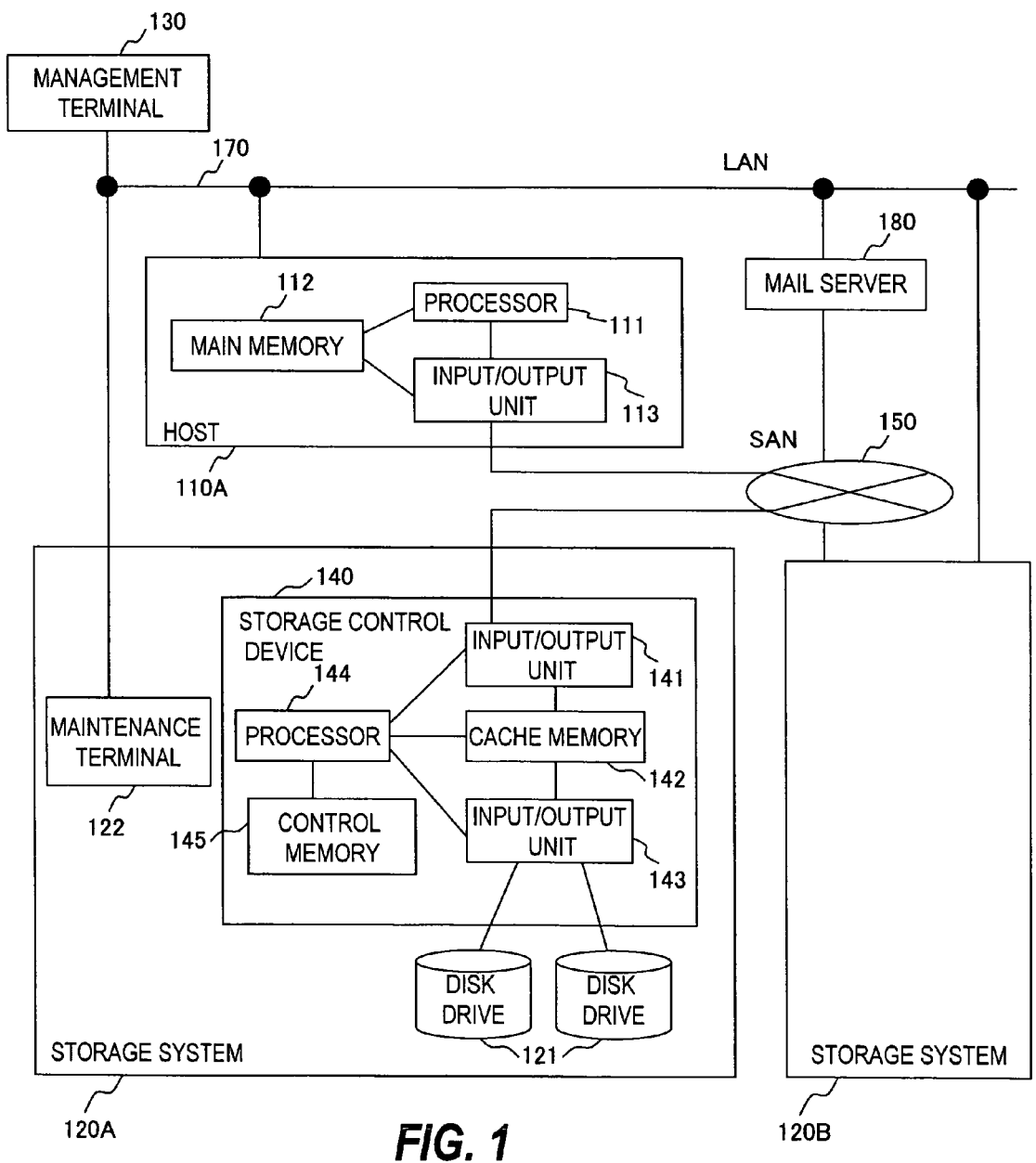
FIG. 1 is a block diagram showing a hardware configuration of a computer system according to an embodiment of this invention.

FIG. 1 is a block diagram showing a hardware configuration of a computer system according to this embodiment.

The computer system of this embodiment is composed of a single or plural hosts 110, a single or plural storage systems 120, a management terminal 130 and a mail server 180. The host(s) 110, the storage system(s) 120, the management terminal 130 and the mail server 180 are connected to one another via a LAN 170. The host(s) 110, the storage system(s) 120 and the mail server 180 are also connected by a storage area network (SAN) 150 to one another in a communicable manner.

This computer system may include plural hosts 110 and plural storage systems 120. Of the host(s) and the storage system(s) of this computer system, shown in FIG. 1 are a host 100A, a storage system 120A and a storage system 120B.

The host 110A is a computer whose components include a processor 111, an input/output unit 113 and a main memory 112. The host 110A communicates with the management terminal 130 and the mail server 180 via the LAN 170. Through the SAN 150, the host 110A writes, to store, data in the storage systems 120 and reads the stored data.

The processor 111 executes a program stored in the main memory 112 to control the operation of the host 100A.

The main memory 112 stores a program executed by the processor 111 and other data.

The input/output unit 113 is an interface that communicates with the storage systems 120 via the SAN 150 to control data transfer.

The storage system 120A is composed of a disk drive 121, a maintenance terminal 122 and a storage control device 140.

The disk drive 121 is a hard disk drive where data written by the host 110A is stored. There may be more than one disk drive 121 in the storage system 120A. The storage system 120A of this embodiment contains plural disk drives 121 which constitute a disk array (RAID).

The maintenance terminal 122 is a computer included in the storage system 120A, through which settings of the storage system 120A are entered. The maintenance terminal 122 communicates with the management terminal 130 via the LAN 170.

The storage control device 140 communicates with the host 110A via the SAN 150 to control data transfer between the host 110A and the disk drives 121.

The storage control device 140 is composed of an input/output unit 141, a cache memory 142, an input/output unit 143, a processor 144 and a control memory 145.

The input/output unit 141 is an interface that communicates with the host 11A via the SAN 150 to control data transfer.

The cache memory 142 is a memory in which data to be transferred between the host 110A and the disk drives 121 is stored temporarily in order to increase the speed of reading/writing data.

The input/output unit 143 is an interface that communicates with the disk drives 121 to control data transfer.

The processor 144 executes a program stored in the control memory 145 to control the operation of the storage control device.

Stored in the control memory 145 are a program executed by the processor 144 and management information necessary to execute the program.

The storage system 120B has the same configuration as the storage system 120A, and the diagram and description of the storage system 120B are therefore omitted.

The management terminal 130 is a computer that communicates, to manage, with the host 110A, the storage systems 120 and the mail server 180 via the LAN 170. The management terminal 130 has the same hardware configuration as the host 110A, and the diagram and description of the management terminal 130 are therefore omitted.

The mail server 180 is a computer that provides an e-mail service to other computers (not shown) connected thereto via the LAN 170. The mail server 180 has the same hardware configuration as the host 110A, and the diagram and description of the mail server 180 are therefore omitted.

To provide an e-mail service, the mail server 180 stores e-mail data in the storage system 120B. The e-mail data stored in the storage system 120B is read by the mail server 180 via the SAN 150 at a given timing (for example, every day at a set time) to be transferred through the LAN 170 to the host 110A.

The host 110A serves as an archive server, and stores the e-mail data transferred by the mail server 180 in the storage system 120A.

The transfer of the e-mail data from the mail server 180 to the host 110A may be executed upon request from the host 110A or upon request from the mail server 180.

The e-mail data may be transferred directly from the storage system 120B to the storage system 120A via the SAN 150, instead of the LAN 170, upon request from the mail server 180 or the host 110A.

Instead of the mail server 180, the host 110A may read the e-mail data stored in the storage system 120B at a given timing via the SAN 150 to store the read e-mail data in the storage system 120A.

The mail server 180 may use the storage system 120A, instead of the storage system 120B, to provide an e-mail service and store e-mail data in the storage system 120A. In this case, the e-mail data is copied at a given timing from a logical device in the storage system 120A that is used by the mail server 180 to another logical device in the storage system 120A that is used by the host 110A. These and other logical devices will be described later with reference to FIG. 2.

This copy processing may be executed by the storage control device 140 of the storage system 120A upon command from the mail server 180 or from the host 110A. Alternatively, the host 110A may read the e-mail data from a logical device in the storage system 120A to store the read e-mail data in another logical device in the storage system 120A that is used by the host 110A.

The e-mail data stored in the storage system 120A may have to be kept for a given period according to a law. In this case, the storage system 120A sets a write inhibitive attribute to a storage area where the e-mail data is stored and thus protects the data against deletion or tampering.

This invention relates to a technique of setting a desired attribute to a desired storage area in such cases.

Figure 2:
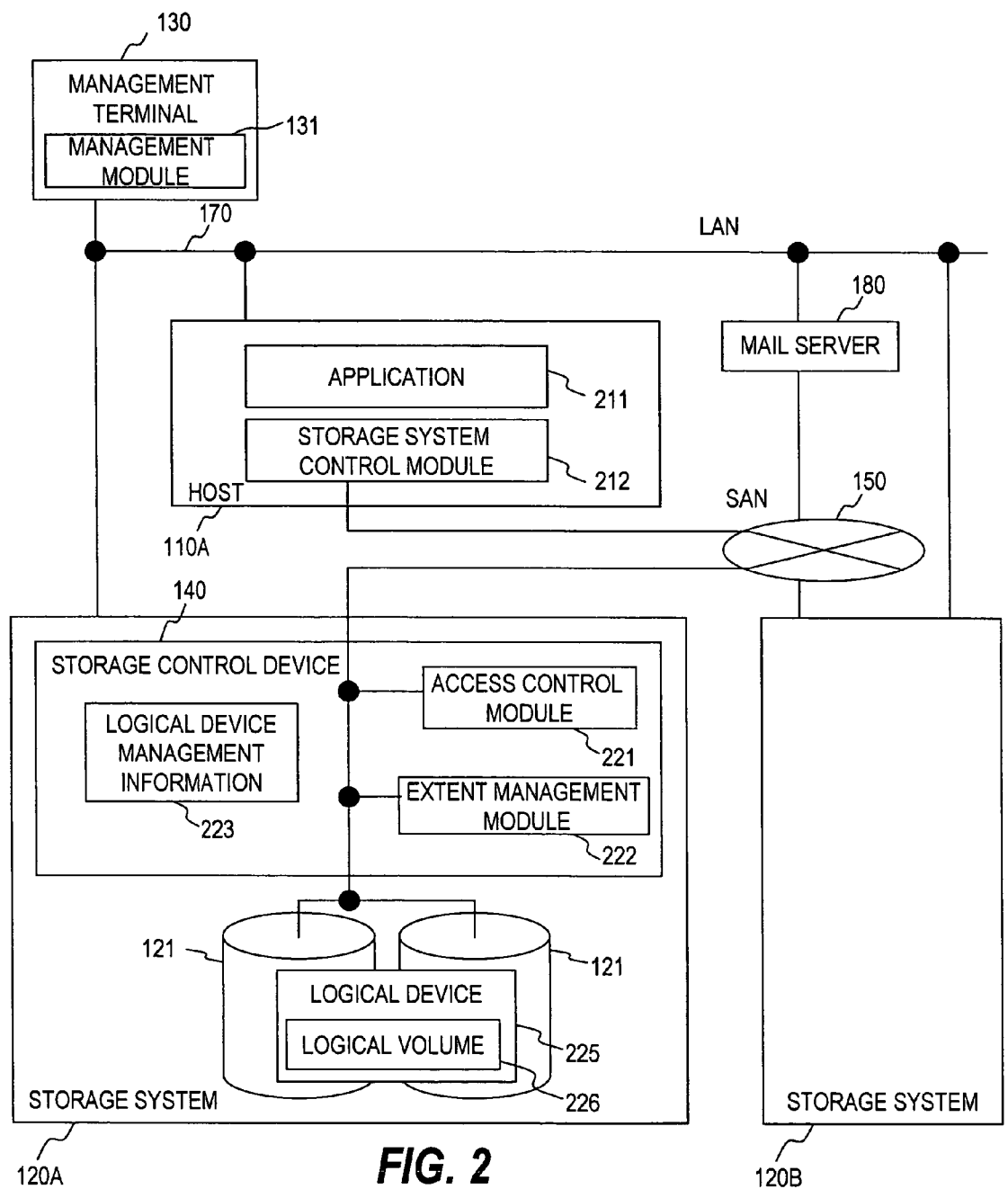
FIG. 2 is a function block diagram of the computer system according to the embodiment of this invention.

FIG. 2 is a function block diagram of the computer system according to this embodiment.

Descriptions of components in FIG. 2 that have already appeared in FIG. 1 will be omitted here.

The host 110A has an application 211 and a storage system control module 212, which are programs stored in the main memory 112 and executed by the processor 111.

The application 211 is a program that makes the host 110A function as an archive server. There may be more than one application 211 in the host 110A in order to give the host 110A other functions.

The storage system control module 212 is a program that controls data write in the storage system 120A and data read in the storage system 120A.

The management terminal 130 has a management module 131, which is a program to manage the host 110A, the storage systems 120 and the mail server 180. The management module 131 may be constituted of plural management programs, for example, one to manage the host 110A, one to manage the storage systems 120, and one to manage the mail server 180. Alternatively, each of the above three management programs may be loaded in a different management terminal 130.

A logical device (LDEV) 225 in the storage system 120A is a storage area managed by the storage system 120A. The storage system 120A handles one logical device 225 as one logical disk drive.

One logical device 225 may physically be a part of a storage area of one disk drive 121, or may be constituted of storage areas of plural disk drives 121. As many number of logical devices 225 as desired can be set in the storage system 120A.

A logical volume (LU) 226 is a storage area in the logical device 225. The host 110A handles one logical volume 226 as one logical disk drive.

In this embodiment, one logical volume 226 corresponds to one logical device 225, although this embodiment is also applicable to the case where one logical device 225 contains plural logical volumes 226.

Figure 3:
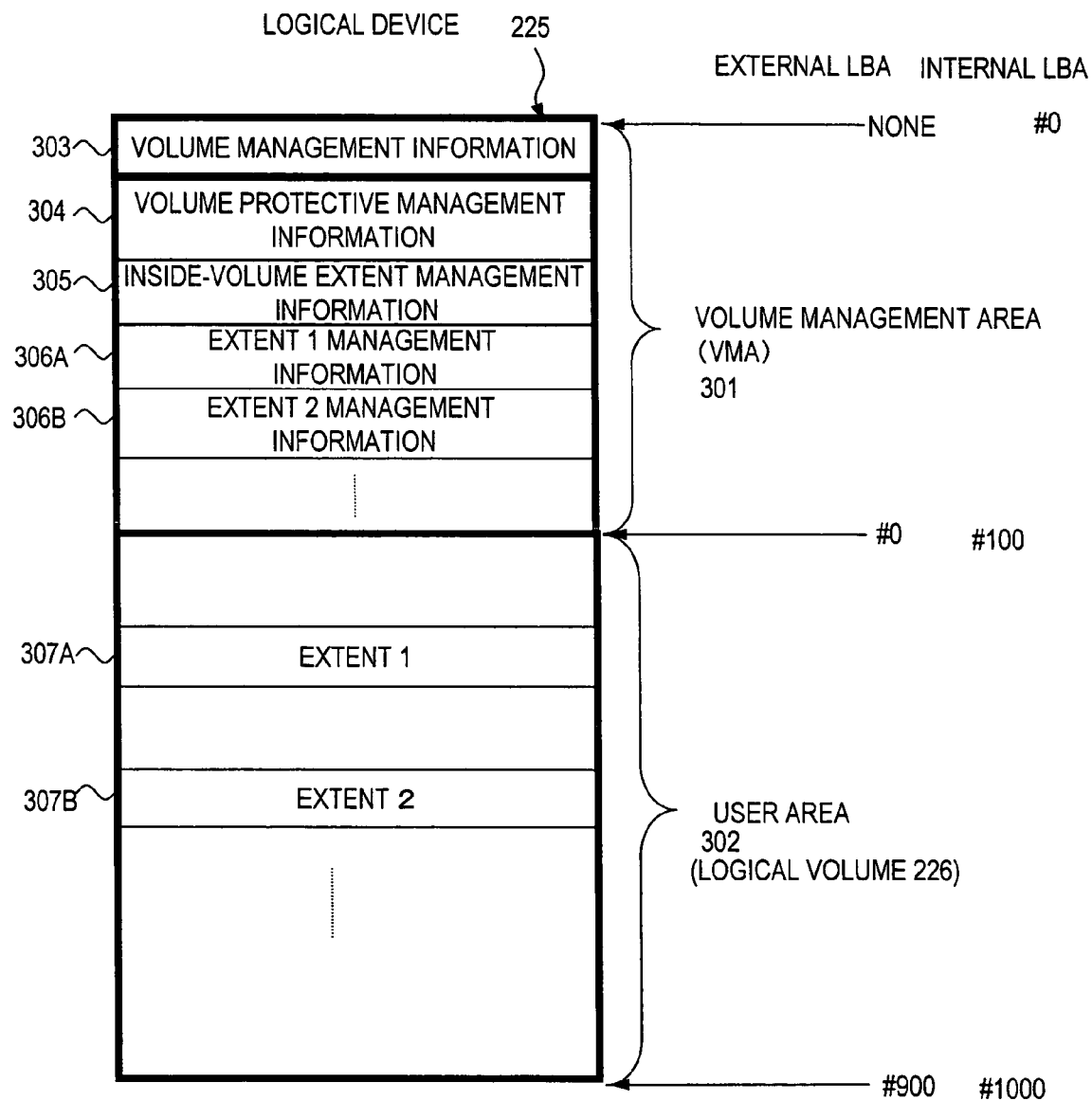
FIG. 3 is an explanatory diagram of a storage area in a logical device according to the embodiment of this invention.

A user of the computer system of this embodiment can set any number of extents in the logical volume 226 as shown in FIG. 3. The term "extent" refers to a storage area of a desired size set in the logical volume 226. This invention enables the user to set an access control attribute, such as a write inhibitive attribute or a read inhibitive attribute, to each extent separately.

The logical device 225, the logical volume 226 and extents will be described later in detail.

An access control module 221 and an extent management module 222 in the storage system 120A are programs stored in the control memory 145 and executed by the processor 144.

The access control module 221 responds to an access request (a request to write data or a request to read data) made by the host 110A by accessing the logical volume 226 and executing data write or read. When an attribute such as a write inhibitive attribute is set to the accessed extent, the access control module 221 controls access to the extent according to the attribute.

The extent management module 222 manages an extent in the logical volume 226. Specifically, the extent management module 222 creates a new extent, deletes an extent, sets an access control attribute to an extent, and executes other similar processing.

Logical device management information 223 is management information of the logical device 225 and is stored in the control memory 145. The logical device management information 223 contains, at least, information on whether or not the logical device 225 has a volume management area 301 shown in FIG. 3. The logical device management information 223 may also contain a logical device number to discriminate one logical device 225 from another, and other information.

The access control module 221, the extent management module 222 and the logical device management information 223 will be described later in detail.

FIG. 3 is an explanatory diagram of a storage area of the logical device 225 according to this embodiment.

In this embodiment, the storage area of the logical device 225 is constituted of the volume management area (VMA) 301 and a user area 302. The volume management area 301 is for storing management information of the logical device 225. The user area 302 is for storing data written by the user, in other words, data written through the host 110A. The user area 302 corresponds to the logical volume 226.

The volume management area 301 holds, at least, volume management information 303, volume protective management information 304, inside-volume extent management information 305 and extent management information 306.

The volume management information 303 contains information to manage the entire logical device 225, such as the attribute, size and the like of the logical device 225. Details of the volume management information 303 will be described later.

The volume protective management information 304 contains information about an access control attribute that is set to the entire logical device 225 (in other words, the entire logical volume 226). This area is used, as in prior art, to set an access control attribute such as a write inhibitive attribute to the entire logical volume 226. A detailed description of the volume protective management information 304 is therefore omitted in this embodiment.

The inside-volume extent management information 305 contains information to manage every extent set in the logical volume 226. An example of such information contained in the inside-volume extent management information 305 is a flag that indicates whether one or more extents are set in the logical volume 226. Details of the inside-volume extent management information 305 will be given later.

The extent management information 306 is prepared for each extent set in the logical volume 226, and contains information to manage its associated extent. The example of FIG. 3 has extent management information 306A and 306B in association with two extents (Extent 1 and Extent 2) set in the logical volume 226 (namely, the user area 302). An example of information contained in the extent management information 306 is one about an access control attribute set to its associated extent.

The user can set any area in the user area 302 as an extent 307. Furthermore, the user can set a desired access control attribute to each extent 307.

Areas in the logical device 225 are constituted of logical blocks (not shown). Each area in the logical device 225 is therefore defined by a logical block address (LBA).

There are two types of LBA, external LBA which is recognized by the host 110A and internal LBA which is recognized by the storage systems 120. Logical blocks constituting the volume management area 301 are each given an internal LBA but not an external LBA.

In the example of FIG. 3, the logical device 225 is constituted of logical blocks having LBAs "0" through "1000", and the volume management area 301 has 100 of those logical blocks. In this case, internal LBAs from "0" through "99" are given to the logical blocks of the volume management area 301 while no external LBA is given. The head logical block of the user area 302 has an internal LBA "100" and an external LBA "0". The tail logical block of the user area 302 has an internal LBA "1000" and an external LBA "900".

The user can set the size of the volume management area 301 and the size of the user area 302 at his/her discretion.

The user may set the logical device 225 such that the logical device 225 does not have the volume management area 301 at all. However, in order to set plural extents 307 in the logical volume 226 and set an access control attribute to each extent 307, the logical device 225 has to have the volume management area 301, or information held by the volume management area 301 has to be stored in the control memory 145.

When the storage control device 140 has many logical devices 225 to control, shortage of capacity of the control memory 145 may cause a failure in storing the volume management information 303, the volume protective management information 304, the inside-volume extent management information 305 and the extent management information 306 for every logical device 225. In such cases, it is preferable for each logical device 225 to have the volume management area 301.

In the case where one storage system 120A or 120B has both the logical device 225 that has the volume management area 301 and the logical device 225 that does not, the control memory 145 needs to contain information on whether the volume management area 301 is provided or not for each logical device 225.

FIG. 4 is an explanatory diagram of the volume management information 303 according to this embodiment.

The volume management information 303 contains a total size 401, a VMA type 402 and a VMA size 403. These values are set at user's discretion.

The total size 401 is the overall size of the logical device 225, and corresponds to the sum of the size of the volume management area 301 and the size of the user area 302.

The VMA type 402 is information indicating use of the volume management area 301. However, since the volume management area 301 has to be used to set an access control attribute to each extent 307 as shown in FIG. 3 in order to carry out this invention, the VMA type 402 of this embodiment is information indicating that the volume management area 301 is used in setting an access control attribute to each extent 307.

The VMA size 403 is the size of the volume management area 301. The VMA size 403 may be a fixed value or may be set at user's discretion.

The logical device management information 223 shown in FIG. 2 may contain a part of or the entirety of the volume management information 303.

Figure 5:
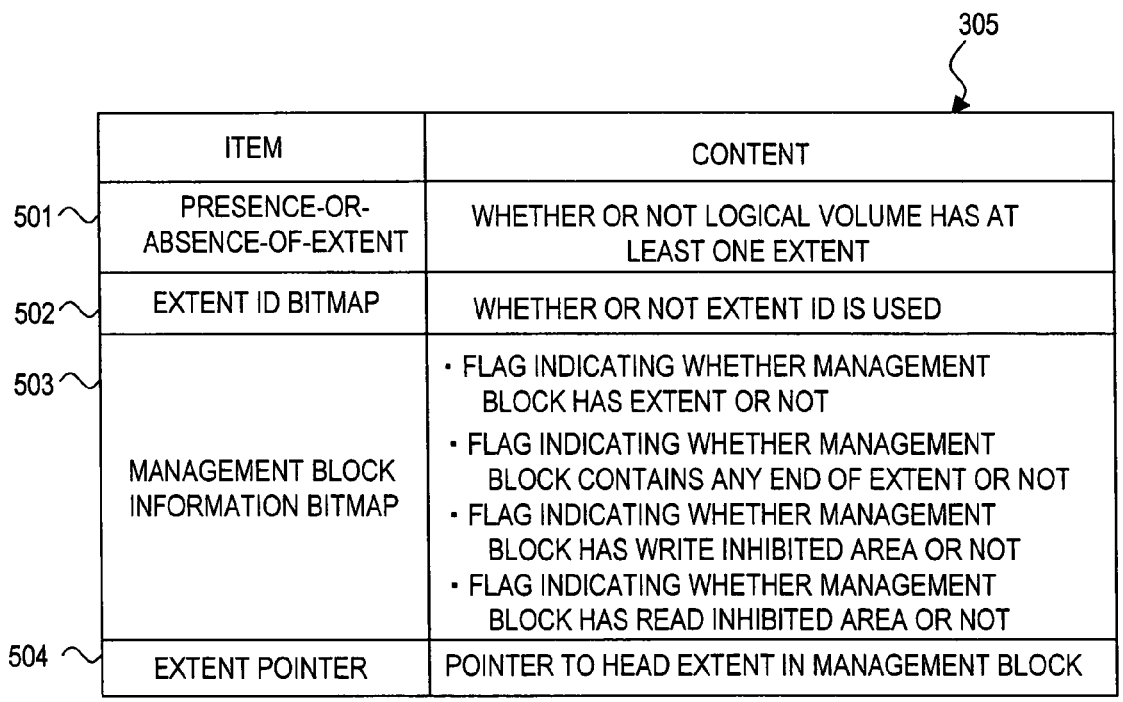
FIG. 5 is an explanatory diagram of inside-volume extent management information according to the embodiment of this invention.

FIG. 5 is an explanatory diagram of the inside-volume extent management information 305 according to this embodiment.

The inside-volume extent management information 305 contains presence-or-absence-of-extent 501, an extent ID bitmap 502, a management block information bitmap 503 and an extent pointer 504.

The presence-or-absence-of-extent 501 is information that shows whether the logical volume 226 has at least one extent 307.

Figure 6:
FIG. 6 is an explanatory diagram of extent management information according to the embodiment of this invention.

The extent ID bitmap 502 is a bitmap of an extent ID 601 used by the extent 307 set in the logical volume 226. The extent ID 601 is shown in FIG. 6.

When the extent ID 601 is of 2 bytes (16 bits), for instance, there can be 65536 different extent IDs 601 in the logical volume 226. The area of the extent ID bitmap 502 in this case is of 655536 bits (8 kilobytes), which respectively correspond to the 65536 conceivable variations of the extent ID 601. Each bit serves as a flag to indicate whether its associated extent ID 601 is actually in the logical volume 226.

The management block information bitmap 503 is a bitmap to show the status of a management block 801, which is provided in the logical volume 226 and which is illustrated in FIG. 8. Specifically, the management block information bitmap 503 contains status flags indicating whether each management block 801 has at least one extent 307, whether each management block 801 contains any end (start point or end point) of the extent 307, whether each management block 801 has a write inhibited area, and whether each management block 801 has a read inhibited area.

The term "write inhibited area" refers to the extent 307 to which a write inhibitive attribute is set, and the term "read inhibited area" refers to the extent 307 to which a read inhibitive attribute is set.

When the management block 801 contains at least one extent 307, the flag that indicates whether this management block has at least one extent 307 or not is set to a value that means "valid" (1, for example).

When the management block 801 contains any end of the extent 307, the flag that indicates whether this management block has any end of the extent 307 is set to a value that means "valid". In other words, when this flag is set to a value that means "valid", this management block 801 contains either the start point or end point of the extent 307, or both.

When a write inhibitive attribute is set to at least one extent 307 contained in the management block 801, the flag that indicates whether this management block 801 has a write inhibited area is set to a value that means "valid".

When a read inhibitive attribute is set to at least one extent 307 contained in the management block 801, the flag that indicates whether this management block 801 has a read inhibited area is set to a value that means "valid".

Access control with the use of the management block 801 and the management block information bitmap 503 will be described later in detail with reference to FIGS. 8 and 9.

The extent pointer 504 is a pointer to the head extent 307 in each management block 801. Specifically, when the management block 801 has only one extent 307, the extent pointer 504 is the extent ID 601 of the extent 307. Meanwhile, the extent ID 601 of the head extent 307 serves as the extent pointer 504 when there are plural extents 307 in the management block 801.

The logical device management information 223 shown in FIG. 2 may contain a part of or the entirety of the inside-volume extent management information 305.

FIG. 6 is an explanatory diagram of the extent management information 306 according to this embodiment.

The extent management information 306 contains the extent ID 601, an attribute 602, a head external LBA 603, an extent length 604, a retention term set date 605, a retention term 606, an extent pointer 607, a shredding progress rate 608 and a shredding pattern 609.

Shredding is processing of repeatedly writing a specific pattern in order to erase data in the extent 307 completely. Once shredding is executed, data written prior to the shredding cannot be restored.

The extent ID 601 is the unique identifier of each extent 307 in the logical volume 226. When the extent ID 601 is of 2 bytes (16 bits), for instance, there can be 65536 different identifiers as the extent ID 601. In other words, the logical volume 226 can have 65536 extents 307 at maximum.

The attribute 602 is a status flag that indicates an attribute set to the extent 307. For example, a write inhibitive attribute, a read inhibitive attribute, a shredding inhibitive attribute, and a mid-shredding attribute are set to the extent 307. Bits of the attribute 602 respectively correspond to these attributes, and each bit serves as a flag to indicate whether the attribute it represents is set to the extent 307 or not.

The write inhibitive flag and the read inhibitive flag may be set by the user through the host 110A, the management terminal 130 or the maintenance terminal 122. Alternatively, the host 110A or the storage system 120A may automatically set these flags.

When the write inhibitive flag is set to a value that means "valid", a write inhibitive attribute is set to the extent 307. As a result, data write in this extent 307 is inhibited. When the read inhibitive flag is set to a value that means "valid", a read inhibitive attribute is set to the extent 307. As a result, data read in this extent 307 is inhibited.

The relation between the flags and types of access allowed will be described later in detail.

The shredding inhibitive flag and the mid-shredding flag are automatically set by the storage system 120A.

For instance, the shredding inhibitive flag is usually "valid" (which indicates that shredding is inhibited) and, when the write inhibitive attribute is removed, is changed to "invalid". While the shredding inhibitive flag reads "invalid", the user can execute shredding. After the shredding is finished, the shredding inhibitive flag is changed back to "valid".

The mid-shredding flag is set to "valid" when execution of shredding is started and to "invalid" when the shredding is finished.

The head external LBA 603 is the external LBA of the head logical block of the extent 307 as shown in FIG. 3.

The extent length 604 is the size of the extent.

The retention term set date 605 is the date and time when the write inhibitive flag and the read inhibitive flag are set to "valid".

The retention term 606 is a period during which bringing the write inhibitive flag and the read inhibitive flag invalid is inhibited. The retention term 606 is set when these flags are set to "valid".

For instance, at 0:00 Oct. 1, 2004, the user sets the write inhibitive flag to "valid" for one extent 307 and sets "one year" as the period during which bringing the write inhibitive flag invalid is inhibited. In this case, "0:00 Oct. 1, 2004" is written as the retention term set date 605 of this extent 307, which shows the date and time when the write inhibitive flag is set to "valid", and "one year" is written as the retention term 606 in which bringing the write inhibitive flag invalid is inhibited. As a result, a write inhibitive attribute is set to this extent 307 and kept set up to 0:00 Oct. 1, 2005. In other words, no data can be written in this extent 307 until 0:00 Oct. 1, 2005 arrives.

The extent pointer 607 is, in the case where the management block 801 containing one extent 307 also has the next extent 307, the extent ID 601 of the next extent 307.

The shredding progress rate 608 is a value (%) to indicate how far along shredding has progressed.

The shredding pattern 609 is a data pattern written during shredding. In the example of FIG. 6, a pattern "0x00000000" is written first, then a pattern "0xFFFFFFFF", and then the pattern "0x00000000" again during shredding.

The logical device management information 223 shown in FIG. 2 may contain a part of or the entirety of the extent management information 306.

FIG. 7 is an explanatory diagram of the association between an attribute set to the extent 307 and the type of access allowed for this extent 307 in this embodiment.

One of access types is a normal mode in which data read and write are both allowed (701). The normal mode is established when the write inhibitive flag of the attribute 602 in the extent management information 306 is set to "o" (meaning "invalid") and the read inhibitive flag thereof is set to "0".

A read-only mode (702) permits data read but inhibits data write. The read-only mode is established when the write inhibitive flag is set to "1" (meaning "valid") and the read inhibitive flag is set to "0".

A write-only mode (703) permits data write but inhibits data read. The write-only mode is established when the read inhibitive flag is set to "1" and the write inhibitive flag is set to "0".

A read/write inhibitive mode (704) inhibits data read and write both. The read/write inhibitive mode is established when the write inhibitive flag is set to "1." and the read inhibitive flag is set to "1".

Figure 8A:
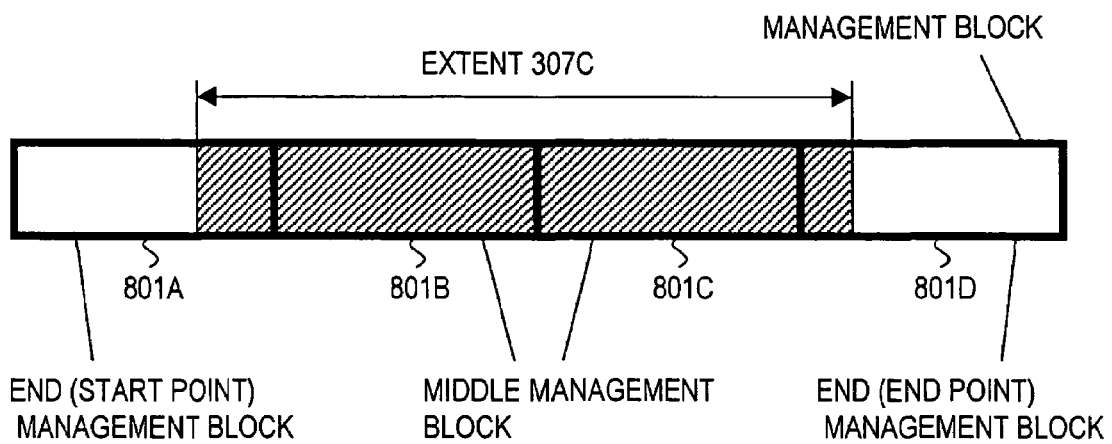
FIGS. 8A and 8B are explanatory diagrams of management blocks according to the embodiment of this invention.
Figure 8B:
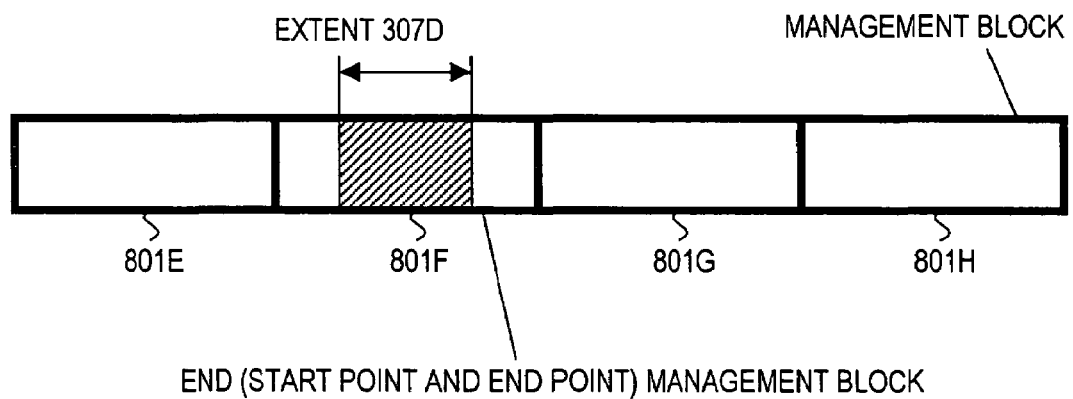

FIGS. 8A and 8B are explanatory diagrams of management blocks according to this embodiment.

The entirety of the logical volume 226 in this embodiment is divided into management blocks 801 of a predetermined size. The size of each management block 801 is fixed and, for example, 32 megabytes.

On the other hand, the extent 307 can take any position and can have any size. FIG. 8A shows a case in which one extent 307C spreads over plural management blocks 801, and FIG. 8B shows a case in which one extent 307D is contained inside one management block 801.

In the example of FIG. 8A, the extent 307C has its start point in some part of a management block 801A, spreads throughout management blocks 801B and 801C, and is ended at some point in a management block 801D. The management block 801A, which contains here an end (the start point) of the extent 307C, is called an end management block. The management blocks 801B and 801C correspond to a middle portion of the extent 307C and are called middle management blocks. The management block 801D, which contains an end (the end point) of the extent 307C, is also called an end management block.

In the example of FIG. 8B, on the other hand, the extent 307D is contained inside a management block 801F. In other words, the management block 801F contains the ends (start point and end point) of the extent 307D. The management block 801F is therefore called an end management block.

The extent 307C in FIG. 8A takes up the whole management blocks 801B and 801C, making it impossible to create a new extent 307 in the management blocks 801B and 801C. In the case where a write inhibitive attribute is set to the extent 307C, data write too is impossible in the management blocks 801B and 801C.

Management blocks 801E, 801G and 801H in FIG. 8B, on the other hand, have no extent 307. It is therefore possible to create a new extent and write or read data in the management blocks 801E, 801G and 801H.

Of creation of a new extent, data write, and data read, what type of processing is allowed and what type is not can be judged for each management block 801 when the management block 801 to be judged is one of middle management blocks as are 801B and 801C or management blocks that have no extent as are 801E, 801G and 801H. This makes it easy to judge which processing is allowed and which is not.

When the management block 801 to be judged is one of end management blocks as are 801A, 801D and 801F, on the other hand, it is necessary to judge more closely what type of processing is allowed and what type is not.

A detailed description will be given with reference to FIG. 9 on this processing executability judgment based on the type of the management block 801.

FIG. 9 is an explanatory diagram of the relation between a status flag of the management block 801 and a judgment made about what type of processing is allowed and what type is not.

A status flag 901 in FIG. 9 corresponds to the contents of the management block information bitmap 503 in the inside-volume extent management information 305. Specifically, the status flag 901 includes a flag (903) to indicate whether the management block 801 contains at least one extent 307, a flag (904) to indicate whether the management block 801 contains any end of the extent 307, a flag (905) to indicate whether the management block 801 contains a write inhibited area, and a flag (906) to indicate whether the management block 801 contains a read inhibited area.

When a value "1" is set to the flag (903) that indicates whether the management block 801 contains at least one extent 307 or not, this management block 801 contains at least one extent 307. The same applies to the rest of the flags of the status flag 901.

FIG. 9 shows every combination of values of the four flags. However, combinations on rows 926 to 928 and 933 to 936 of FIG. 9 do not exist since the management block 801 that has no extent 307 contains none of an end of the extent 307, a write inhibited area, and a read inhibited area.

A processing executability judgment 902 is a judgment made on whether particular processing is executable to the management block 801 or not. Types of processing to be judged are creation of a new extent 307 (907), data write (910), and data read (911). The processing (907) of creating a new extent 307 is divided into a case (908) in which the management block 801 to be judged is an end management block of the extent 307 to be newly created (hereinafter referred to as "new extent 307") and a case (909) in which the management block 801 to be judged is a middle management block of the new extent 307.

When the management block 801 has no extent 307, all of the three processing types are judged as "executable (OK)" (925).

When the management block 801 has at least one extent 307 (903) and this management block 801 is a middle management block of the new extent 307 (909), the processing of creating the new extent 307 is judged as "unexecutable (NG)" (921 to 924, 929 to 932).

When the management block 801 contains at least one extent 307 but not any end of this extent 307 (904), this management block 801 is a middle management block of the extent 307. When this management block 801 is also an end management block of the new extent 307 (908), the processing of creating the new extent 307 is judged as "unexecutable" (921, 924, 929, 932).

When the management block 801 contains at least one extent 307 (903) and at least one end of this extent 307, too (904), this management block 801 is an end management block of the extent 307. When this management block 801 is also an end management block of the new extent 307 (908), the new extent 307 can be created in some cases and cannot be created in other cases. It is therefore judged that more detailed judging is necessary (922, 923, 930, 931).

Specifically, the new extent 307 cannot be created in the case where the existing extent 307 and the new extent 307 overlap with each other in the management block 801. The new extent 307 can be created when the existing extent 307 and the new extent 307 do not overlap with each other in the management block 801.

Similarly, when the management block 801 does not have a write inhibited area (905), the processing of writing data in this management block 801 is judged as "executable" (921, 922, 929, 930). When the management block 801 contains a write inhibited area (905) but not any end of the extent 307 (904), the processing of writing data in this management block 801 is judged as "unexecutable" (924, 932). When the management block 801 contains a write inhibited area (905) and at least one end of the extent 307, too (904), data write in this management block 801 is possible in some cases and impossible in other cases. Specifically, when data is to be written at some point in the write inhibited area, the data cannot be written. It is therefore judged that a detailed judging procedure is necessary (923, 931).

When the management block 801 does not have a read inhibited area (906), the processing of reading data in this management block 801 is judged as "executable" (921 to 924). When the management block 801 contains a read inhibited area (909) but not any end of the extent 307 (904), the processing of reading data in this management block 801 is judged as "unexecutable" (929, 932). When the management block 801 contains a read inhibited area (906) and at least one end of the extent 307, too (904), data read in this management block 801 is possible in some cases and impossible in other cases. Specifically, when data is to be read is located inside the read inhibited area, the data cannot be read. It is therefore judged that more detailed judging is necessary (930, 931).

A specific example of the processing executability judgment based on the type of the management block 801 will be described with reference to FIGS. 8A and 8B and FIG. 9.

In FIG. 8A, when a write inhibitive attribute is set to the extent 307C but not a read inhibitive attribute, the management block 801A contains the extent 307C, an end of the extent 307C, and a write inhibited area, but does not have a read inhibited area. In other words, the status flag 901 of the management block 801A corresponds to the row 923 of FIG. 9.

In the case where a new extent 307 is to be created in the management block 801A and an end of the new extent 307 is in the management block 801A, the new extent 307 overlaps with the extent 307C in some cases and does not in other cases. More detailed judging is therefore necessary (908). The new extent 307 can be created when the new extent 307 does not overlap with the extent 307C.

When an end of the new extent 307 is not within the management block 801A, the new extent 307 overlaps with the extent 307C without exception, making it impossible to create the new extent 307 (909).

When data is to be written in the management block 801A outside the extent 307C, the data can be written. When the data is to be written at some point in the extent 307C, the data cannot be written. It is therefore necessary to judge closely whether data is to be written inside or outside the extent 307C (910).

The management block 801A does not contain a read inhibited area. Accordingly, all data in the management block 801A can be read (911).

Figure 10:
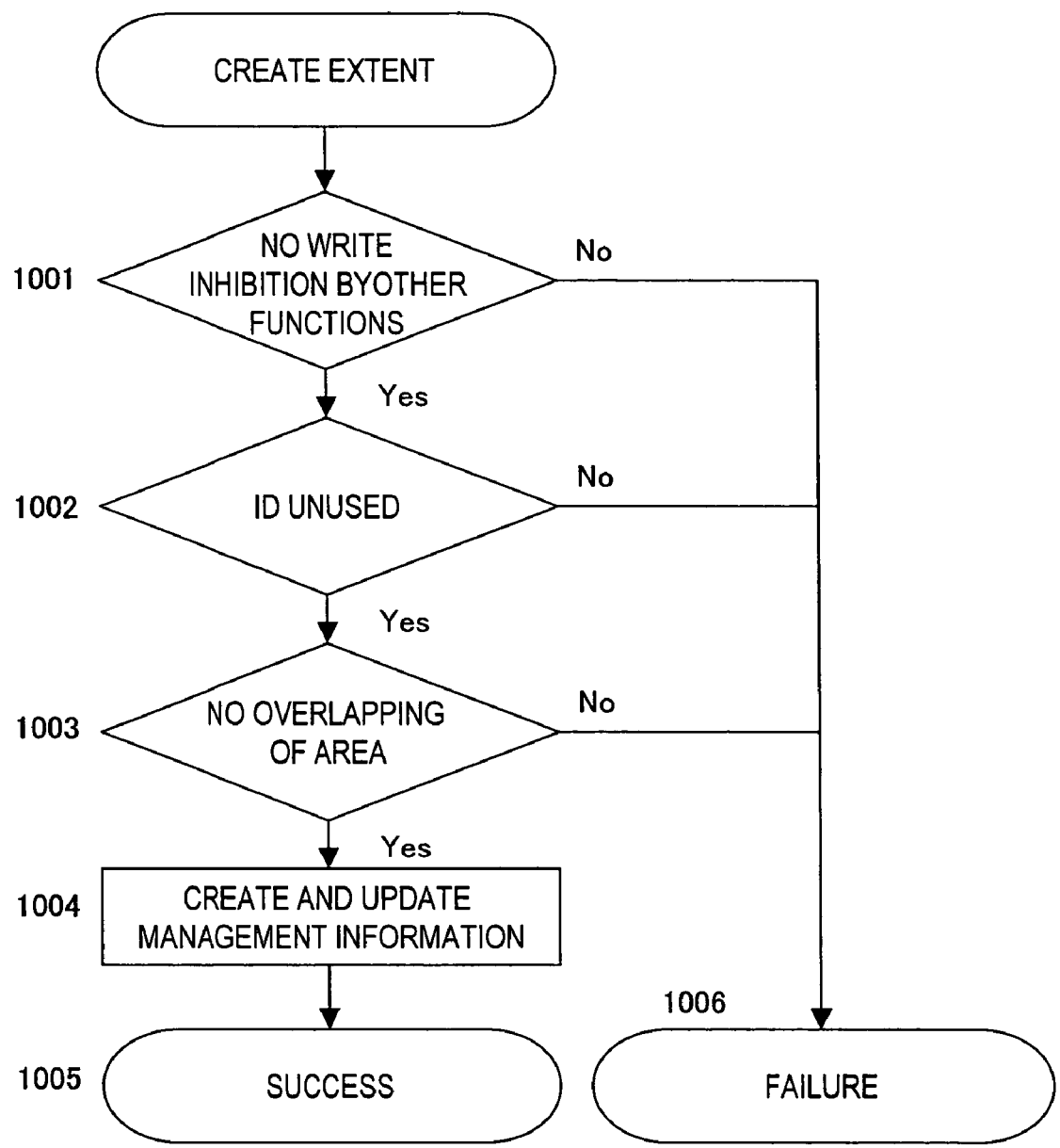
FIG. 10 is a flowchart of extent creating processing executed by an extent management module according to the embodiment of this invention.

FIG. 10 is a flowchart of extent creating processing executed by the extent management module 222 according to this embodiment.

The extent creating processing is executed by the extent management module 222 when a command to create a new extent 307 (extent creating command) is received from the host 110A or from the management terminal 130.

The extent creating command contains the extent ID 601, head external LBA 603 and extent length 604 of the extent 307 to be created, and information to identify the logical volume 226 in which the new extent 307 is to be created.

In the following description on FIG. 10, the extent ID 601, the head external LBA 603 and the extent length 604 that are contained in the extent creating command are referred to as relevant extent ID 601, relevant head external LBA 603 and relevant extent length 604. The logical volume 226 in which the new extent 307 is to be created as specified by the extent creating command is referred to as relevant logical volume 226.

As reception of the extent creating command starts the extent creating processing, the extent management module 222 judges whether data write in the logical device 225 that contains the relevant logical volume 226 is inhibited by other functions (1001). Cases where data write in the logical device 225 is inhibited by other functions include one in which a write inhibitive attribute is set to the entire logical device 225, one in which a write inhibitive attribute is set to the relevant logical volume 226, and one in which data write in the logical device 225 is inhibited by other programs executed on the storage system 120A.

When it is judged in the step 1001 that data write in this logical device 225 or logical volume 226 is inhibited by other functions, updating the volume management area 301 of the logical device 225 is not possible and accordingly the new extent 307 cannot be created. The extent creating processing thus fails (1006).

On the other hand, when it is judged in the step 1001 that data write in the logical device 225 and in the relevant logical volume 226 is not inhibited by any other function, the new extent 307 can be created.

Whether the relevant extent ID 601 is in use is judged next (1002). Specifically, whether the relevant extent ID 601 is in use is judged by referring to the extent ID bitmap 502.

When it is judged in the step 1002 that the relevant extent ID 601 is in use, the relevant extent ID cannot be used in creating the new extent 307. The extent creating processing thus fails (1006).

On the other hand, when it is judged in the step 1002 that the relevant extent ID 601 is not in use, the relevant extent ID can be used in creating the new extent 307.

Judged next is whether the area of the new extent 307 overlaps with the area of the existing extent 307 or not (1003). This judging procedure will be described later in detail with reference to FIGS. 11 to 14.

When it is judged in the step 1003 that the area of the new extent 307 overlaps with the area of the existing extent 307, the new extent 307 cannot be created in this area. The extent creating processing thus fails (1006).

On the other hand, when it is judged in the step 1003 that the area of the new extent 307 does not overlap with the area of the existing extent 307, the new extent 307 can be created in this area.

Next, management information is created and updated (1004). Specifically, the inside-volume extent management information 305 is updated and new extent management information 306 is created to reflect the new extent 307. The newly created extent management information 306 is added to the volume management area 301.

The extent creating processing now succeeds and the new extent 307 is set in the logical device 225 (1005). At this point, the extent management module 222 notifies the host 110A or the management terminal 130 that has issued the extent creating command of the success of the extent creating processing.

When the extent creating processing fails (1006), the extent management module 222 notifies the host 110A or the management terminal 130 that has issued the extent creating command of the failure of the extent creating processing (that no new extent 307 is created).

Described next with reference to FIGS. 11 to 14 is the judging procedure in the step 1003.

The extent management module 222 judges, for each management block 801 where the new extent 307 is to be created, whether the management block 801 contains either the start point or end point of the new extent 307, or contains the start point and the end point both, or contains neither the start point nor the end point.

Figure 11:
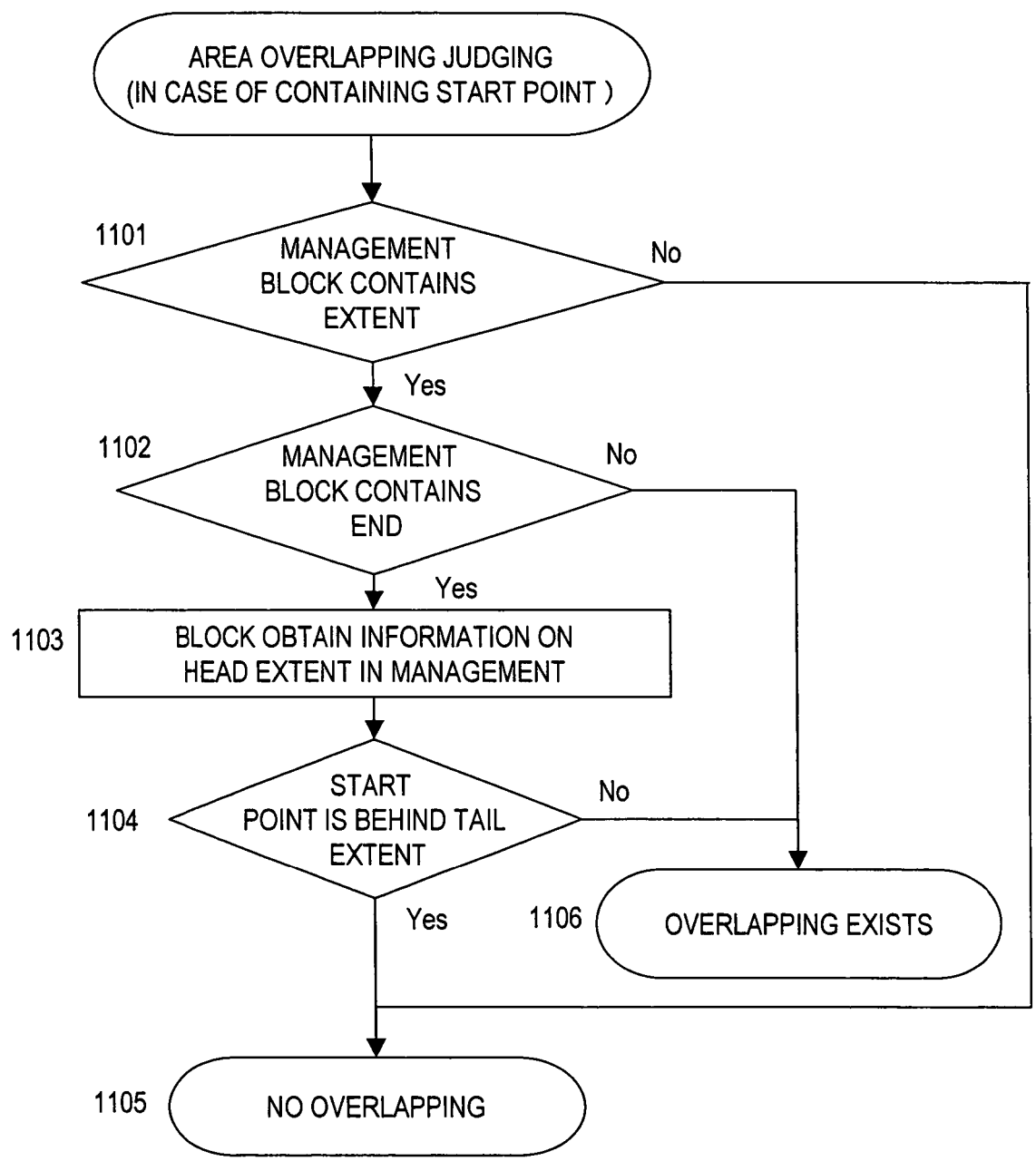
FIG. 11 is a flowchart of processing executed when a management block contains a start point of a newly created extent in the embodiment of this invention.

When the management block 801 contains the start point of the new extent 307, processing of FIG. 11 is executed.

Figure 12:
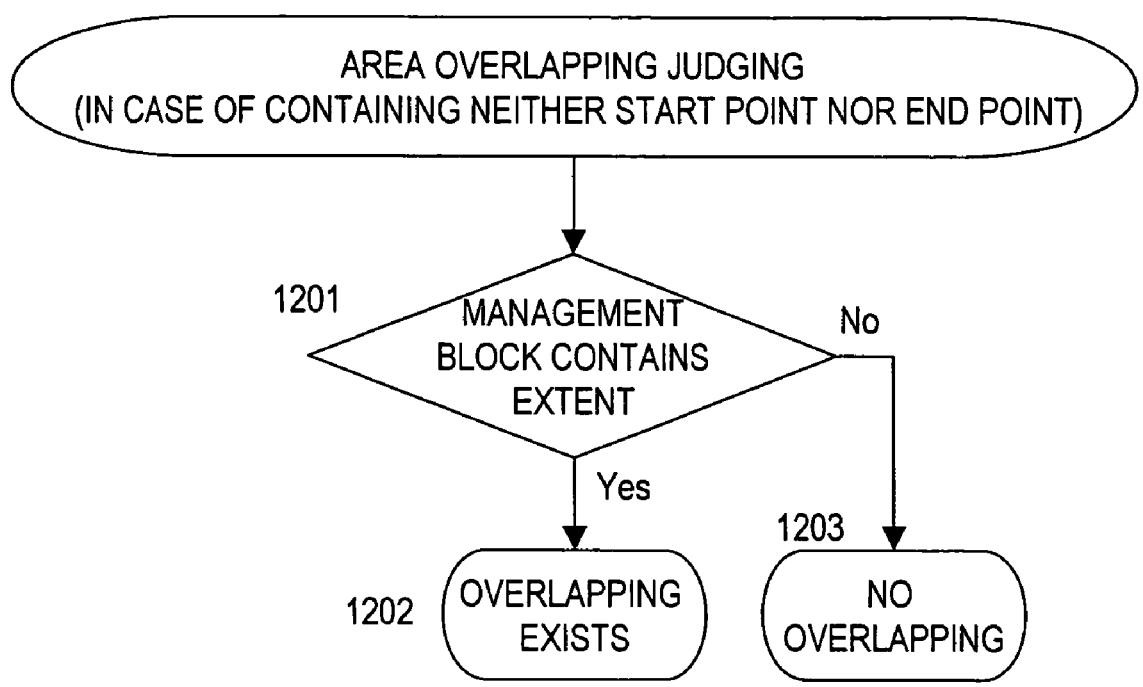
FIG. 12 is a flowchart of processing executed when a management block contains neither a start point nor end point of a newly created extent in the embodiment of this invention.

When the management block 801 contains neither the start point nor end point of the new extent 307, processing of FIG. 12 is executed.

Figure 13:
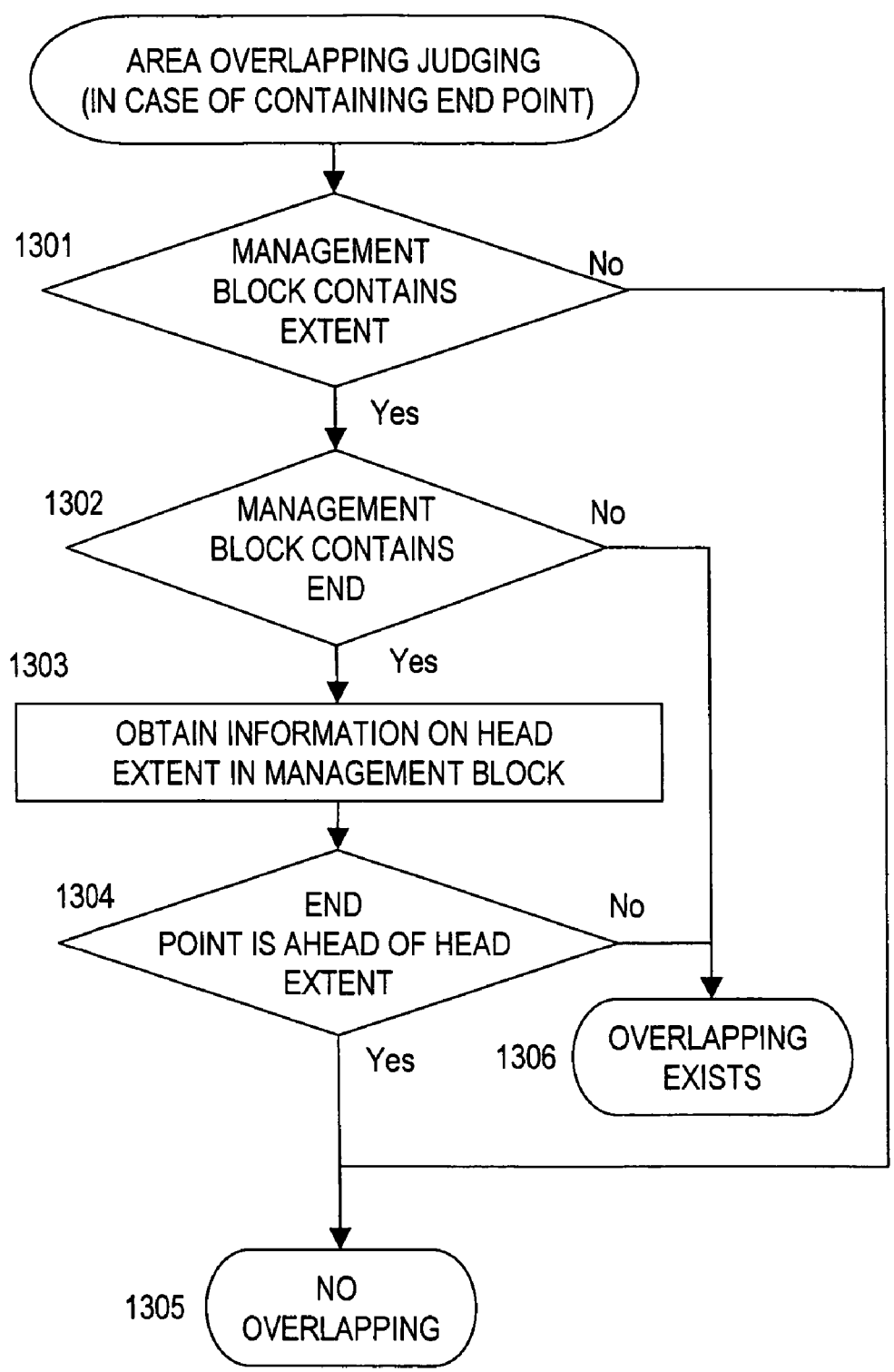
FIG. 13 is a flowchart of processing executed when a management block contains an end point of a newly created extent in the embodiment of this invention.

When the management block 801 contains the end point of the new extent 307, processing of FIG. 13 is executed.

Figure 14:
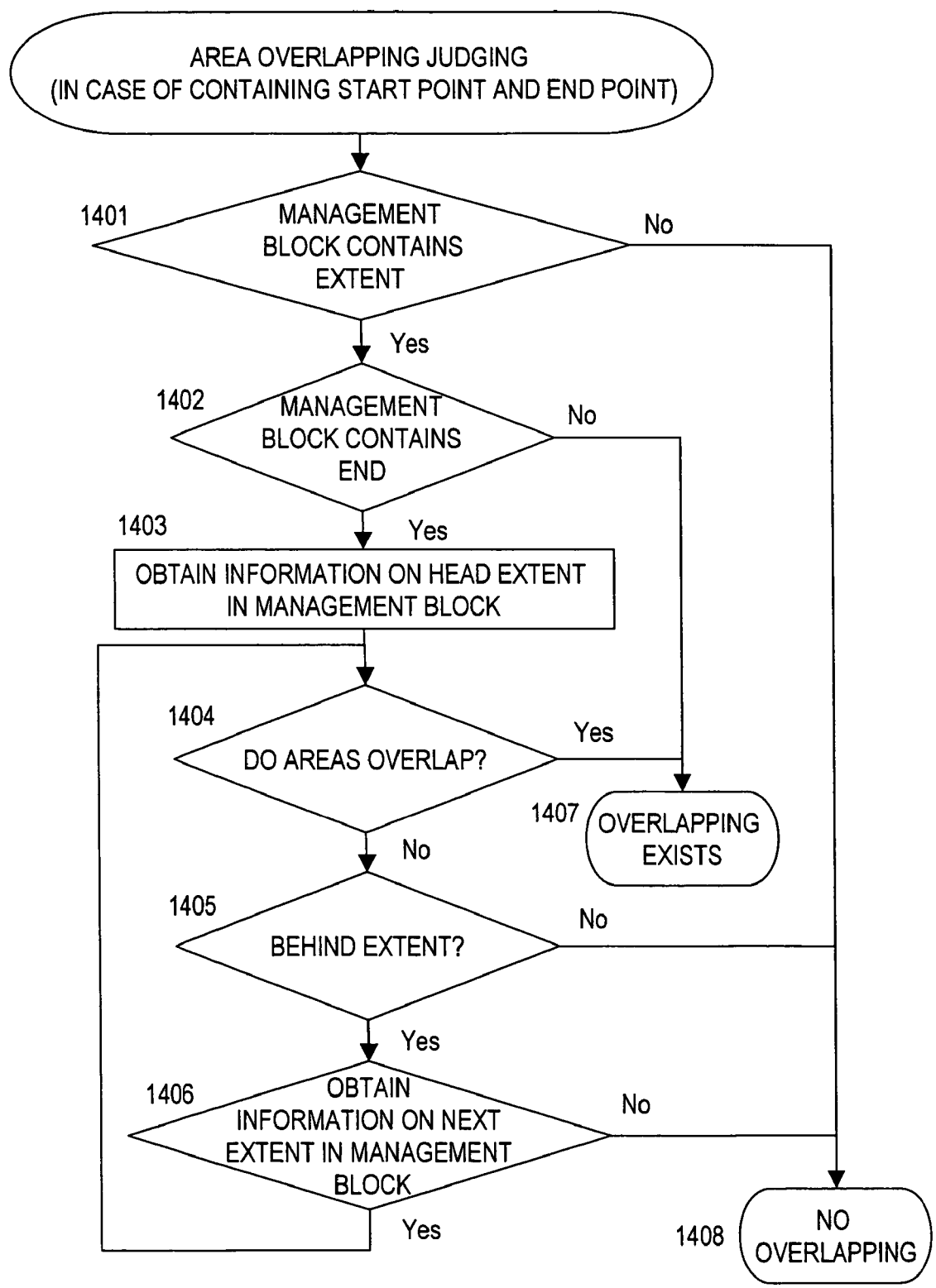
FIG. 14 is a flowchart of processing executed when a management block contains both a start point and end point of a newly created extent in the embodiment of this invention.

When the management block 801 contains both the start point and end point of the new extent 307, processing of FIG. 14 is executed.

As the above processing is completed for every management block 801 where the new extent 307 is to be created, results of the processing are consulted. When even one management block 801 out of these management blocks is regarded as "overlapping", it is judged in the step 1003 that the area of the new extent 307 overlaps with the area of the existing extent 307.

The processing of FIGS. 11 to 14 will be described in detail below.

FIG. 11 is a flowchart of the processing executed when the management block 801 contains the start point of the new extent 307 in this embodiment.

As the processing of FIG. 11 is started, whether the management block 801 to be judged has at least one existing extent 307 or not is judged first (1101). Specifically, the management block information bitmap 503 is consulted. When the status flag to indicate whether the management block 801 has any extent 307 is "1" (meaning "valid"), it is judged that this management block 801 has at least one existing extent 307.

When the management block 801 is judged to have no existing extent 307, there is no existing extent 307 whose area would overlap with the area of the new extent 307 in this management block 801. It is therefore judged as "no overlapping" and the processing is ended (1105).

On the other hand, when the management block 801 is judged to have at least one existing extent 307, the area of the new extent 307 overlaps with the existing extent 307 in this management block 801 in some cases.

Then, whether this management block 801 contains any end of the existing extent 307 or not is judged (1102). Specifically, the management block information bitmap 503 is consulted. When the status flag to indicate whether the management block 801 contains any end of the extent 307 is "1" (meaning "valid"), it is judged that this management block 801 contains at least one end of the existing extent 307.

When this management block 801 is judged to contain no end of the existing extent 307, the entirety of this management block 801 is taken up by the one extent 307. Then, the area of the new extent 307 and the area of the existing extent 307 overlap with each other in this management block 801 without exception. It is therefore judged as "overlapping" and the processing is ended (1106).

When this management block 801 is judged to contain at least one end of the existing extent 307, the area of the existing extent 307 overlaps with the area of the new extent 307 in this management block 801 in some cases.

Then, information is obtained on the existing tail extent 307 of this management block 801 (1103).

The tail extent 307 is the rearmost extent 307 among the existing extents 307 in the management block 801 that is being judged. The foremost extent 307 among the existing extents 307 in the management block 801 that is being judged is called the head extent 307. In the case where the management block 801 that is being judged has only one existing extent 307, this extent 307 is simultaneously the head extent and the tail extent.

Specifically, the extent ID 601 is obtained for the tail extent 307 of this management block 801 by referring to the extent pointers 504 and 607, and the external LBA of the end point of the tail extent 307 is obtained from the head external LBA 603 and extent length 604 of the tail extent 307.

Whether the start point of the new extent 307 is behind the tail extent 307 is judged next (1104). Specifically, whether the head external LBA 603 of the new extent 307 is behind the external LBA of the end point of the tail extent 307 or not is judged.

When it is judged that the start point of the new extent 307 is behind the tail extent 307, the area of the new extent 307 does not overlap with the area of any existing extent 307 in this management block 801. It is therefore judged as "no overlapping" and the processing is ended (1105).

On the other hand, when it is judged that the start point of the new extent 307 is not behind the tail extent 307, the area of the new extent 307 overlaps with the area of the existing extent 307 in this management block 801. It is therefore judged as "overlapping" and the processing is ended (1106).

FIG. 12 is a flowchart of the processing executed when the management block 801 contains neither the start point nor end point of the new extent 307 in this embodiment.

Detailed descriptions on steps in FIG. 12 similar to those of FIG. 11 will be omitted.

As the processing of FIG. 12 is started, whether the management block 801 to be judged has any existing extent 307 is judged first (1201).

When the management block 801 is judged to have no existing extent 307, there is no existing extent 307 whose area would overlap with the area of the new extent 307 in this management block 801. It is therefore judged as "no overlapping" and the processing is ended (1203).

On the other hand, when the management block 801 is judged to have at least one existing extent 307, the area of the existing extent 307 overlaps with the area of the new extent 307 in this management block 801 without exception. It is therefore judged as "overlapping" and the processing is ended (1202).

FIG. 13 is a flowchart of the processing executed when the management block 801 contains the end point of the new extent 307 in this embodiment.

Detailed descriptions on steps in FIG. 13 similar to those of FIGS. 11 and 12 will be omitted.

As the processing of FIG. 13 is started, whether the management block 801 to be judged has any existing extent 307 is judged first (1301).

When the management block 801 is judged to have no existing extent 307, there is no existing extent 307 whose area would overlap with the area of the new extent 307 in this management block 801. It is therefore judged as "no overlapping" and the processing is ended (1305).

On the other hand, when the management block 801 is judged to have at least one existing extent 307, the area of the existing extent 307 overlaps with the area of the new extent 307 in this management block 801 in some cases.

Then, whether this management block 801 contains any end of the existing extent 307 or not is judged (1302).

When this management block 801 is judged to contain no end of the existing extent 307, the entirety of this management block 801 is taken up by the one extent 307. Then, the area of the new extent 307 and the area of the existing extent 307 overlap with each other in this management block 801 without exception. It is therefore judged as "overlapping" and the processing is ended (1306).

When this management block 801 is judged to contain at least one end of the existing extent 307, the area of the existing extent 307 overlaps with the area of the new extent 307 in this management block 801 in some cases.

Then, information is obtained on the existing head extent 307 of this management block 801 (1303). Specifically, the extent ID 601 is obtained for the head extent 307 of this management block 801 by referring to the extent pointer 504, and the head external LBA 603 of the head extent 307 is obtained.

Whether the end point of the new extent 307 is ahead of the head extent 307 is judged next (1304). Specifically, whether the tail external LBA of the new extent 307 is ahead of the head external LBA 603 of the head extent 307 or not is judged. The tail external LBA of the new extent 307 is obtained from the head external LBA 603 and extent length 604 of this new extent 307.

When it is judged that the end point of the new extent 307 is ahead of the head extent 307, the area of the new extent 307 does not overlap with the area of any existing extent 307 in this management block 801. It is therefore judged as "no overlapping" and the processing is ended (1305).

On the other hand, when it is judged that the end point of the new extent 307 is not ahead of the head extent 307, the area of the new extent 307 overlaps with the area of the existing extent 307 in this management block 801. It is therefore judged as "overlapping" and the processing is ended (1306).

FIG. 14 is a flowchart of the processing executed when the management block 801 contains both the start point and end point of the new extent 307 in this embodiment.

Detailed descriptions on steps in FIG. 14 similar to those of FIGS. 11 to 13 will be omitted.

As the processing of FIG. 14 is started, whether the management block 801 to be judged has any existing extent 307 is judged first (1401).

When the management block 801 is judged to have no existing extent 307, there is no existing extent 307 whose area would overlap with the area of the new extent 307 in this management block 801. It is therefore judged as "no overlapping" and the processing is ended (1408).

On the other hand, when the management block 801 is judged to have at least one existing extent 307, the area of the existing extent 307 overlaps with the area of the new extent 307 in this management block 801 in some cases.

Then, whether this management block 801 contains any end of the existing extent 307 or not is judged (1402).

When this management block 801 is judged to contain no end of the existing extent 307, the entirety of this management block 801 is taken up by the one extent 307. Then, the area of the new extent 307 and the area of the existing extent 307 overlap with each other in this management block 801 without exception. It is therefore judged as "overlapping" and the processing is ended (1407).

When this management block 801 is judged to contain at least one end of the existing extent 307, the area of the existing extent 307 overlaps with the area of the new extent 307 in this management block 801 in some cases.

Then, information is obtained on the existing head extent 307 of this management block 801 (1403). Specifically, the head external LBA 603 and tail external LBA of the head extent 307 are obtained.

Whether the area of the new extent 307 overlaps with the area of the head extent 307 or not is judged next (1404). Specifically, whether the area of the new extent 307 overlaps with a range starting from the head external LBA 603 of the head extent 307 which has been obtained in the step 1403 and ending at the obtained tail external LBA is judged.

When it is judged that the area of the new extent 307 overlaps with the area of the head extent 307, the area of the new extent 307 overlaps with the area of at least one existing extent 307 in this management block 801 to be judged. It is therefore judged as "overlapping" and the processing is ended (1407).

On the other hand, when it is judged that the area of the new extent 307 does not overlap with the area of the head extent 307, the area of the new extent 307 overlaps with the area of another existing extent 307 (one that is not the head extent 307) in this management block 801 in some cases.

Then, whether the new extent 307 is behind the existing extent 307 of the step 1404 is judged (1405).

When it is judged that the new extent 307 is not behind the existing extent 307 of the step 1404, the area of the new extent 307 does not overlap with any existing extent 307 in this management block 801. It is therefore judged as "no overlapping" and the processing is ended (1408).

On the other hand, when it is judged that the new extent 307 is behind the existing extent 307 of the step 1404, the area of the new extent 307 overlaps with the area of one of other existing extents 307 than the existing extent 307 of the step 1404 in this management block 801 in some cases.

Then, information is obtained on the next existing extent 307 of the management block 801 (1406). Specifically, the extent pointer 607 of the existing extent 307 of the step 1404 is consulted to obtain the extent ID 601 of the extent 307 next to the existing extent 307 of the step 1404. Thereafter, the head external LBA 603 and the tail external LBA that are associated with the obtained extent ID 601 are obtained to judge whether the area of the next extent 307, which has been obtained in the step 1406, overlaps with the area of the new extent 307 or not (1404).

In the case where the next extent 307 is not found in the step 1406, the area of the new extent 307 does not overlap with the area of any existing extent 307 in this management block 801. It is therefore judged as "no overlapping" and the processing is ended (1408).

Figure 15:
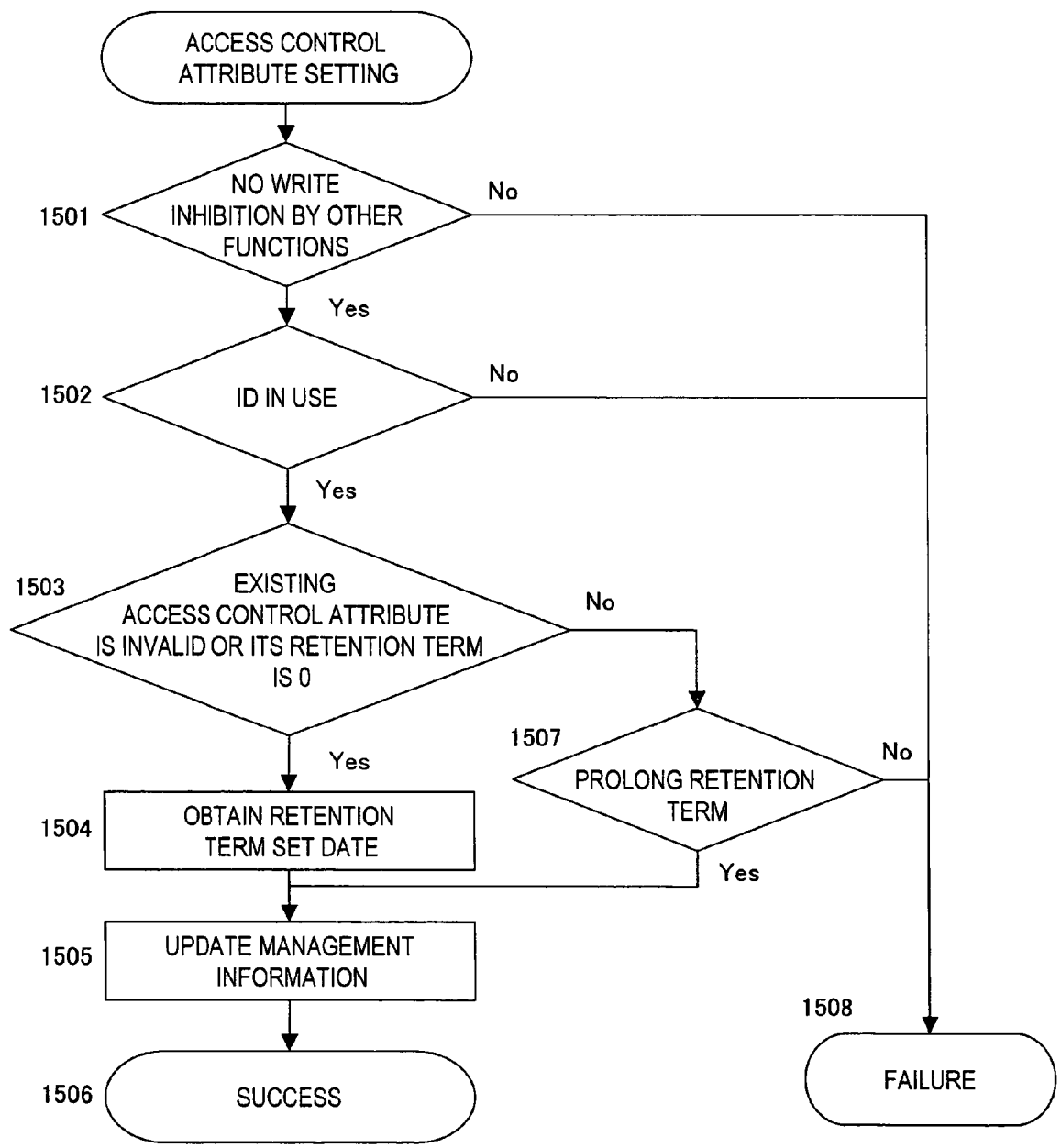
FIG. 15 is a flowchart of access control attribute setting processing executed by the extent management module according to the embodiment of this invention.

FIG. 15 is a flowchart of access control attribute setting processing executed by the extent management module 222 in this embodiment.

Detailed descriptions on steps in FIG. 15 similar to those of FIGS. 10 to 14 will be omitted.

Access control attributes include a write inhibitive attribute and a read inhibitive attribute.

An access control attribute is set when there is a new access control attribute to be set, or when an access control attribute is to be removed, or when the retention term of an existing access control attribute is to be changed. The processing of FIG. 15 is executed to set a new access control attribute and to change the retention term of an existing access control attribute. Processing executed to remove an access control attribute will be described with reference to FIG. 16.

The access control attribute setting processing is executed by the extent management module 222 when a command to set an access control attribute of the extent 307 (an access control attribute setting command) is received from the host 110A or from the management terminal 130.

The access control attribute setting command contains the identifier of the logical volume 226 that has the extent 307 to which an access control attribute is to be set, the extent ID 601 of the extent 307 to which an access control attribute is to be set, an access control attribute to be set, and the retention term 606.

As reception of the access control attribute setting command starts the access control attribute setting processing, the extent management module 222 judges whether data write in the logical device 225 or the logical volume 226 that contains the extent 307 to which the attribute is to be set is inhibited by other functions (1501).

When it is judged in the step 1501 that data write in this logical device 225 or logical volume 226 is inhibited by other functions, updating the volume management area 301 of the logical device 225 is not possible and accordingly the access control attribute cannot be set. The access control attribute setting processing thus fails (1508).

On the other hand, when it is judged in the step 1501 that data write in the logical device 225 and in the relevant logical volume 226 is not inhibited by any other function, the volume management area 301 of the logical device 225 can be updated.

Judged next is whether the extent ID 601 of the extent 307 to which the attribute is to be set is in use or not (1502).

When it is judged in the step 1502 that the extent ID 601 is not in use, there is no extent 307 to which the attribute is to be set. The access control attribute setting processing thus fails (1508).

On the other hand, when it is judged in the step 1502 that the extent ID 601 is in use, there is the extent 307 to which the attribute is set and accordingly the access control attribute setting processing advances to the next step to set the attribute.

The attribute 602 and retention term 606 of the extent 307 to which the attribute is to be set are consulted to judge whether an existing access control attribute set to this extent 307 is "invalid" or not, and whether the retention term of this extent 307 is 0 or not (1503).

A write inhibitive attribute, for example, can be set to this extent 307 when a write inhibitive attribute that has already been set to this extent 307 is "invalid" (in other words, no write inhibitive attribute is set at present), or when the retention term of the write inhibitive attribute that has already been set is "0". Then, the procedure proceeds to a step 1504.

When the write inhibitive attribute that has already been set to this extent 307 is "valid" and the retention term 606 of the write inhibitive attribute that has already been set is not "0", setting a write inhibitive attribute to this extent 307 is not possible in some cases. Specifically, it is allowed to prolong the retention term 606 of the write inhibitive attribute that has already been set while shortening this period is not permitted.

The next step, therefore, is to compare the retention term 606 of a write inhibitive attribute that is about to be set against the retention term 606 of the write inhibitive attribute that has already been set, and judge whether the retention term 606 is prolonged by newly setting the retention term 606 (1507).

When it is judged that the retention term 606 is not prolonged by this act, the access control attribute setting processing fails (1508) since cutting the retention term 606 short is not allowed.

On the other hand, when it is judged that the retention term 606 is prolonged by setting the period anew, the procedure proceeds to a step 1505.

The same procedure is executed in the step 1503 and 1507 on read inhibitive attributes when the access control attribute to be set is a read inhibitive attribute.

In the step 1504, the current time is obtained as the retention term set date 605.

The management information is updated next (1505). Specifically, the management block information bitmap 503, the attribute 602, the retention term set date 605 and the retention term 606 are updated with the values contained in the access control attribute setting command and the values obtained in the above steps.

The access control attribute setting processing now succeeds and is ended (1506). At this point, the extent management module 222 notifies the host 110A or the management terminal 130 that has issued the access control attribute setting command of the success of the access control attribute setting processing.

In the case where the access control attribute setting processing fails (1508), the extent management module 222 notifies the host 110A or the management terminal 130 that has issued the access control attribute setting command of the failure.

Figure 16:
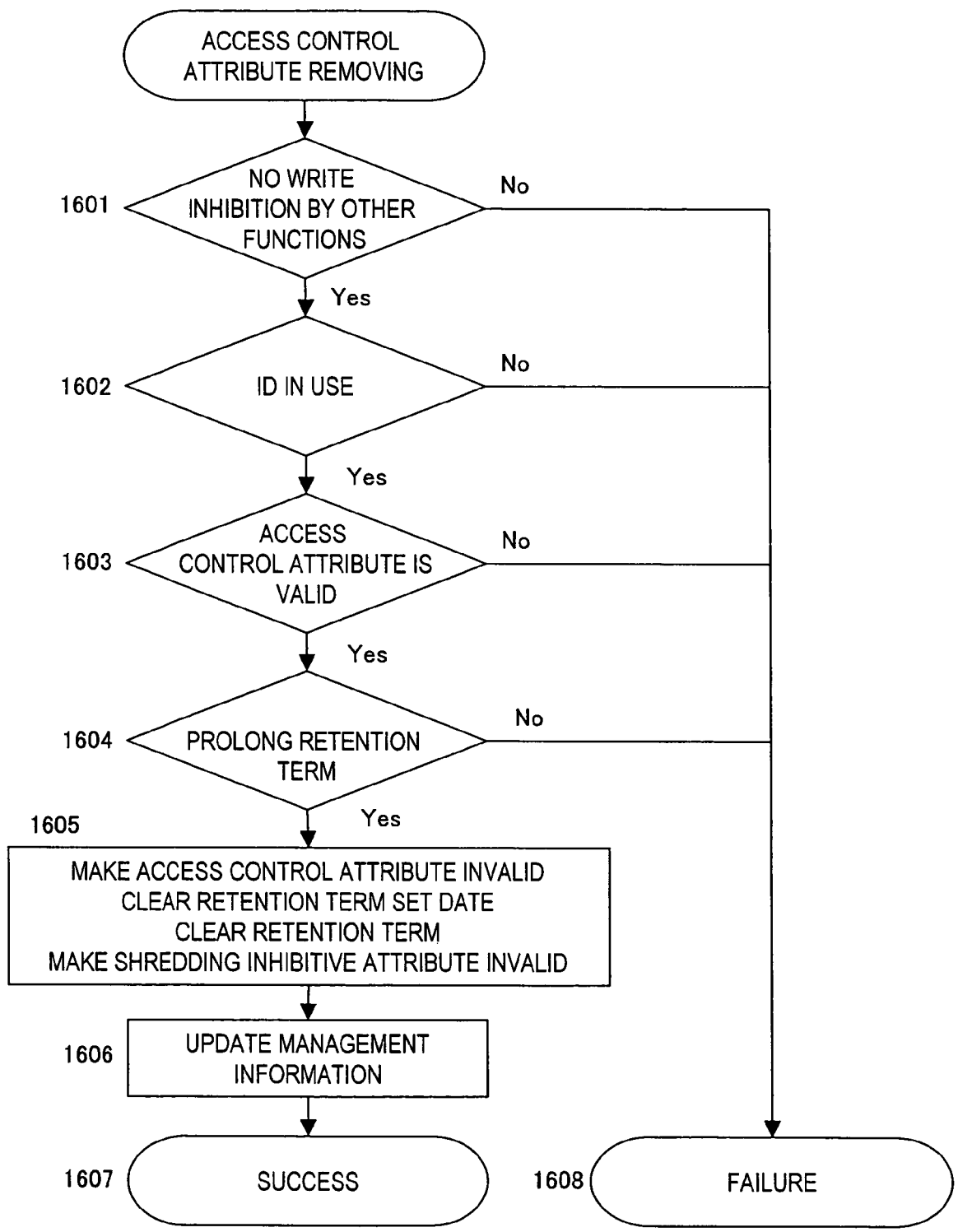
FIG. 16 is a flowchart of access control attribute removing processing executed by the extent management module according to the embodiment of this invention.

FIG. 16 is a flowchart of access control attribute removing processing executed by the extent management module 222 in this embodiment.

Detailed descriptions on steps in FIG. 16 similar to those of FIGS. 10 to 15 will be omitted.

The access control attribute removing processing is processing to remove an access control attribute set to the extent 307 (in other words, to make the attribute "invalid").

The access control attribute removing processing is executed by the extent management module 222 when an access control attribute setting command, which is a request to remove an access control attribute set to the extent 307, is received from the host 110A or from the management terminal 130.

As reception of the access control attribute setting command starts the access control attribute removing processing, the extent management module 222 judges whether data write in the logical device 225 or the logical volume 226 that contains the extent 307 from which the attribute is to be removed is inhibited by other functions (1601).

When it is judged in the step 1601 that data write in this logical device 225 or logical volume 226 is inhibited by other functions, updating the volume management area 301 of the logical device 225 is not possible and accordingly the access control attribute cannot be removed. The access control attribute removing processing thus fails (1608).

On the other hand, when it is judged in the step 1601 that data write in the logical device 225 and in the relevant logical volume 226 is not inhibited by any other function, the volume management area 301 of the logical device 225 can be updated.

Accordingly, judged next is whether the extent ID 601 of the extent 307 from which the attribute is to be removed is in use or not (1602).

When it is judged in the step 1602 that the extent ID 601 is not in use, there is no extent 307 from which the attribute is to be removed. The access control attribute removing processing thus fails (1608).

On the other hand, when it is judged in the step 1602 that the extent ID 601 is in use, there is the extent 307 from which the attribute is to be removed and accordingly the access control attribute removing processing can be continued.

Accordingly, judged next is whether an access control attribute set to the extent 307 from which the attribute is to be removed is "valid" (1603).

For instance, when a write inhibitive attribute set to the extent 307 is "invalid", the write inhibitive attribute has already been removed and there is no write inhibitive attribute to remove from the extent 307. The access control attribute removing processing thus fails (1608).

On the other hand, when the write inhibitive attribute set to the extent 307 is "valid", the write inhibitive attribute cannot be removed in some cases. Specifically, it is allowed to remove the write inhibitive attribute after the retention term 606 of the set write inhibitive attribute expires while removing the attribute before the expiration of this term are not permitted.

The next step, therefore, is to judge whether the retention term 606 has expired or not (1604). When it is judged that the retention term 606 has not expired yet, the access control attribute removing processing fails (1608).

On the other hand, when it is judged that the retention term 606 has already expired, the procedure proceeds to a step 1605.

The same procedure is executed in the step 1603 and 1604 on read inhibitive attributes when the access control attribute to be removed is a read inhibitive attribute.

In the step 1605, the access control attribute is made invalid (removed). Specifically, the corresponding status flag of the attribute 602 is set to "invalid". Then, the corresponding retention term set date 605 and retention term 606 are cleared, and the shredding inhibitive attribute is made invalid.

The management information is updated next (1606). Specifically, the management block information bitmap 503, the attribute 602, the retention term set date 605 and the retention term 606 are updated with the values contained in the access control attribute setting command and the values obtained in the above steps.

The access control attribute removing processing now succeeds and is ended (1607). At this point, the extent management module 222 notifies the host 110A or the management terminal 130 that has issued the access control attribute setting command of the success of the access control attribute removing processing.

In the case where the access control attribute removing processing fails (1608), the extent management module 222 notifies the host 110A or the management terminal 130 that has issued the access control attribute setting command of the failure.

Figure 17:
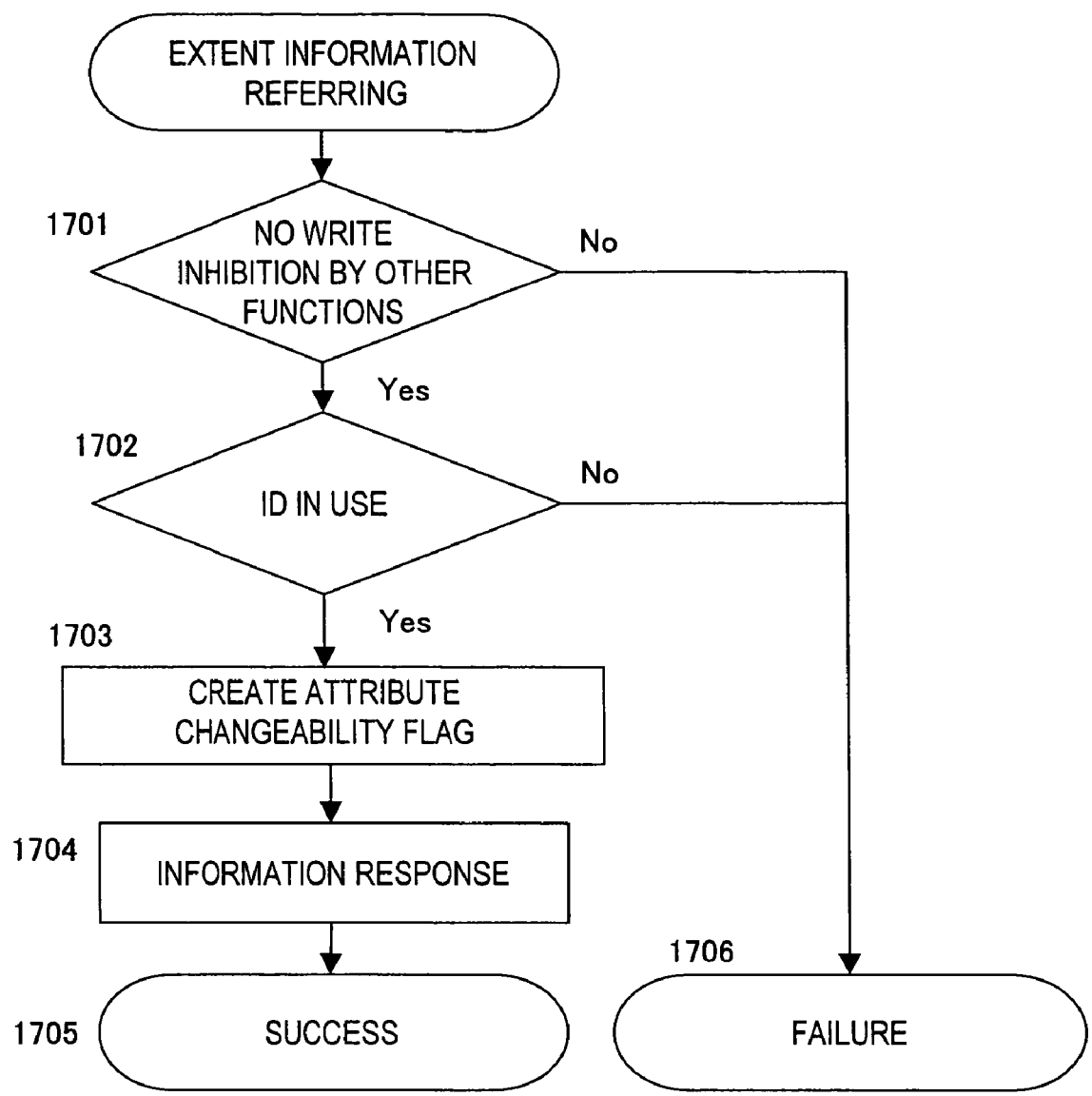
FIG. 17 is a flowchart of extent information referring processing executed by the extent management module according to the embodiment of this invention.

FIG. 17 is a flowchart of extent information referring processing executed by the extent management module 222 in this embodiment.

Detailed descriptions on steps in FIG. 17 similar to those of FIGS. 10 to 16 will be omitted.

The extent information referring processing is processing to consult the extent management information 306 for a specific extent 307.

The extent information referring processing is executed by the extent management module 222 when a command to refer to the extent management information 306 of a particular extent 307 (an extent information referring command) is received from the host 110A or from the management terminal 130.

The extent information referring command contains the identifier of the logical volume 226 that has the extent 307 whose management information is to be consulted, and the extent ID 601 of the extent 307.

As reception of the extent information referring command starts the extent information referring processing, the extent management module 222 judges whether data read in the logical device 225 or the logical volume 226 that contains the extent 307 whose management information is to be consulted is inhibited by other functions (1701).

When it is judged in the step 1701 that data read in this logical device 225 or logical volume 226 is inhibited by other functions, the volume management area 301 of the logical device 225 cannot be consulted. The extent information referring processing thus fails (1706).

On the other hand, when it is judged in the step 1701 that data read in the logical device 225 and in the relevant logical volume 226 is not inhibited by any other function, the volume management area 301 of the logical device 225 can be consulted.

Judged next is whether the extent ID 601 of the extent 307 whose management information is to be consulted is in use or not (1702).

When it is judged in the step 1702 that the extent ID 601 is not in use, there is no extent 307 whose management information is to be consulted. The extent information referring processing thus fails (1706).

On the other hand, when it is judged in the step 1702 that the extent ID 601 is in use, there is the extent 307 for which the extent management information 306 is to be consulted and accordingly the extent information referring processing can be continued.

Next, the extent management information 306 is consulted to create an attribute changeability flag (1703). The attribute changeability flag is a flag to indicate whether it is possible to change an access control attribute set to the extent 307 whose management information is to be consulted. Specifically, the attribute changeability flag is set to "valid" (meaning that the access control attribute can be changed) when the retention term 606 of the access control attribute set to the extent 307 whose management information is to be consulted has already expired. When the retention term 606 has not expired yet, the attribute changeability flag is set to "out of effect" (meaning that the access control attribute cannot be changed).

The contents of the extent management information 306 referred to and the attribute changeability flag created in the step 1703 are sent to the host 110A or the management terminal 130 that has issued the extent information referring command (1704).

The extent information referring processing now succeeds and is ended (1705). At this point, the extent management module 222 notifies the host 110A or the management terminal 130 that has issued the extent information referring command of the success of the extent information referring processing.

In the case where the extent information referring processing fails (1706), the extent management module 222 notifies the host 110A or the management terminal 130 that has issued the extent information referring command of the failure.

Figure 18:
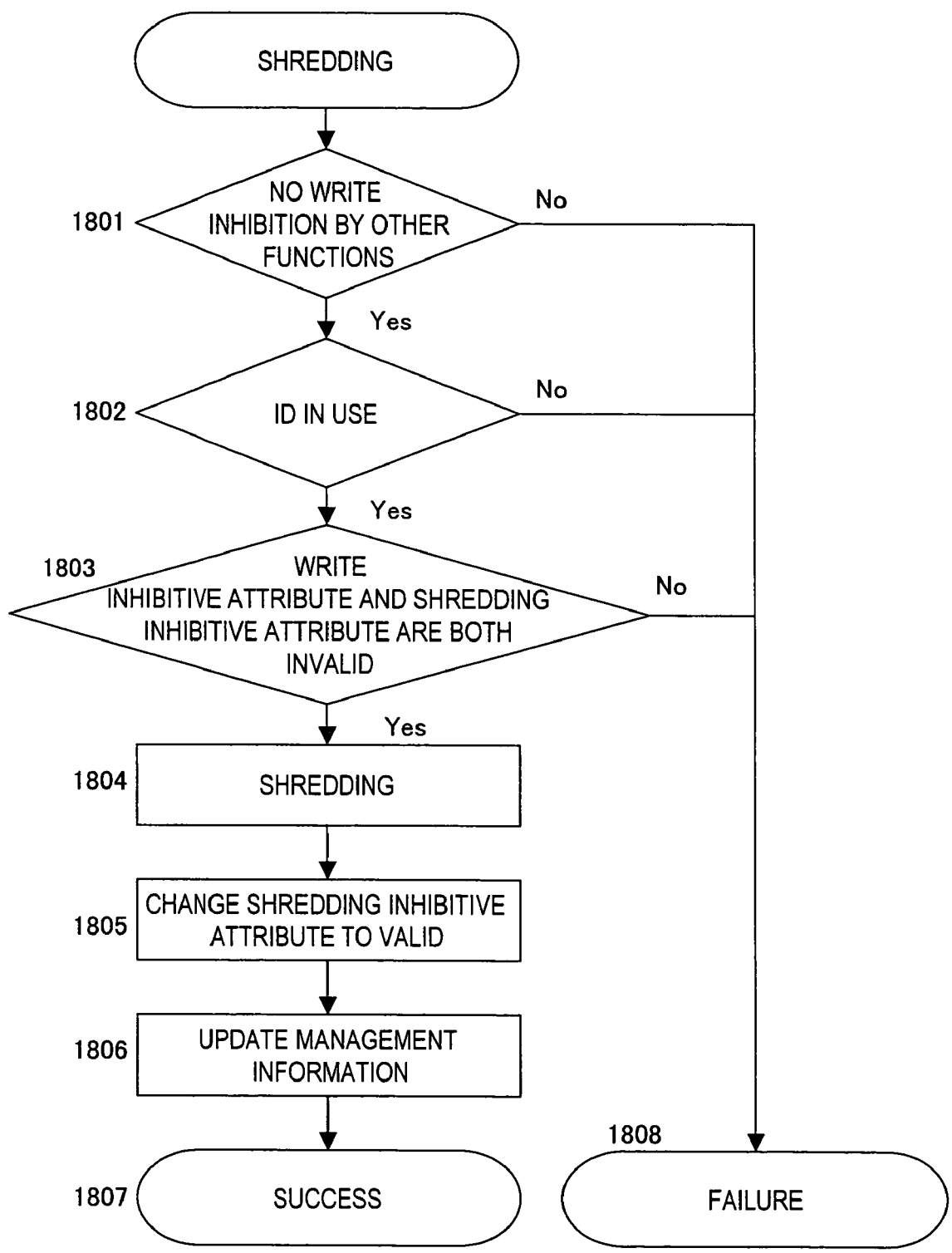
FIG. 18 is a flowchart of shredding processing executed by the extent management module according to the embodiment of this invention.

FIG. 18 is a flowchart of shredding processing executed by the extent management module 222 in this embodiment.

Detailed descriptions on steps in FIG. 18 similar to those of FIGS. 10 to 17 will be omitted.

The shredding processing is processing to perform shredding on a specific extent 307.

The shredding processing is executed by the extent management module 222 when a command to perform shredding on a particular extent 307 (a shredding command) is received from the host 110A or from the management terminal 130.

The shredding command contains the identifier of the logical volume 226 that has the extent 307 on which shredding is to be performed, the extent ID 601 of this extent 307, and a shredding pattern.

As reception of the shredding command starts the shredding processing, the extent management module 222 judges whether data write in the logical device 225 or the logical volume 226 that contains the extent 307 on which shredding is to be performed is inhibited by other functions (1801).

When it is judged in the step 1801 that data write in this logical device 225 or logical volume 226 is inhibited by other functions, no shredding pattern can be written in this extent 307. The shredding processing thus fails (1808).

On the other hand, when it is judged in the step 1801 that data write in the logical device 225 and in the relevant logical volume 226 is not inhibited by any other function, the shredding processing advances to the next step to judge whether the extent ID 601 of the extent 307 on which shredding is to be performed is in use or not (1802).

When it is judged in the step 1802 that the extent ID 601 is not in use, there is no extent 307 to perform shredding on. The shredding processing thus fails (1808).

On the other hand, when it is judged in the step 1802 that the extent ID 601 is in use, there is the extent 307 on which shredding is to be performed.

Next, the attribute 602 of the extent 307 on which shredding is to be performed is consulted to judge whether a write inhibitive attribute and shredding inhibitive attribute of the extent 307 are both "invalid" (1803).

When it is judged in the step 1803 that at least one of the write inhibitive attribute and the shredding inhibitive attribute is not "invalid", the shredding pattern cannot be written in this extent 307. The shredding processing thus fails (1808).

When it is judged in the step 1803 that the write inhibitive attribute and the shredding inhibitive attribute are both "invalid", the shredding pattern can be written in this extent 307.

Then, shredding is executed (1804). Specifically, the shred pattern is written in this extent 307 a given number of times.

While executing the shredding, the flag to indicate whether a write inhibited area is contained and the flag to indicate whether a read inhibited area is contained in the management block information bitmap 503 of the management block 801 associated with the extent 307 on which the shredding is being performed are both set to a value that means "valid".

After the shredding is finished, each management block 801 is searched for extents 307 that are not shredding subjects and where data write is inhibited. When such extents 307 are not contained, the flag to indicate whether a write inhibited area is contained is set to "invalid". Similarly, each management block 801 is searched for extents 307 that are not shredding subjects and where data read is inhibited. When such extents 307 are not contained, the flag to indicate whether a read inhibited area is contained is set to "invalid".

Then, the shredding inhibitive attribute of the extent 307 on which the shredding has been performed is updated to "valid" (1805). This inhibits shredding on the extent 307 until its shredding inhibitive attribute is changed to "invalid".

The management information is updated next (1806). Specifically, the attribute 602 of the extent management information 306 is updated to reflect the update made in the step 1805.

The shredding command now succeeds and is ended (1807). At this point, the extent management module 222 notifies the host 110A or the management terminal 130 that has issued the shredding command of the success of the shredding processing.

In the case where the shredding processing fails (1808), the extent management module 222 notifies the host 110A or the management terminal 130 that has issued the shredding command of the failure.

Figure 19:
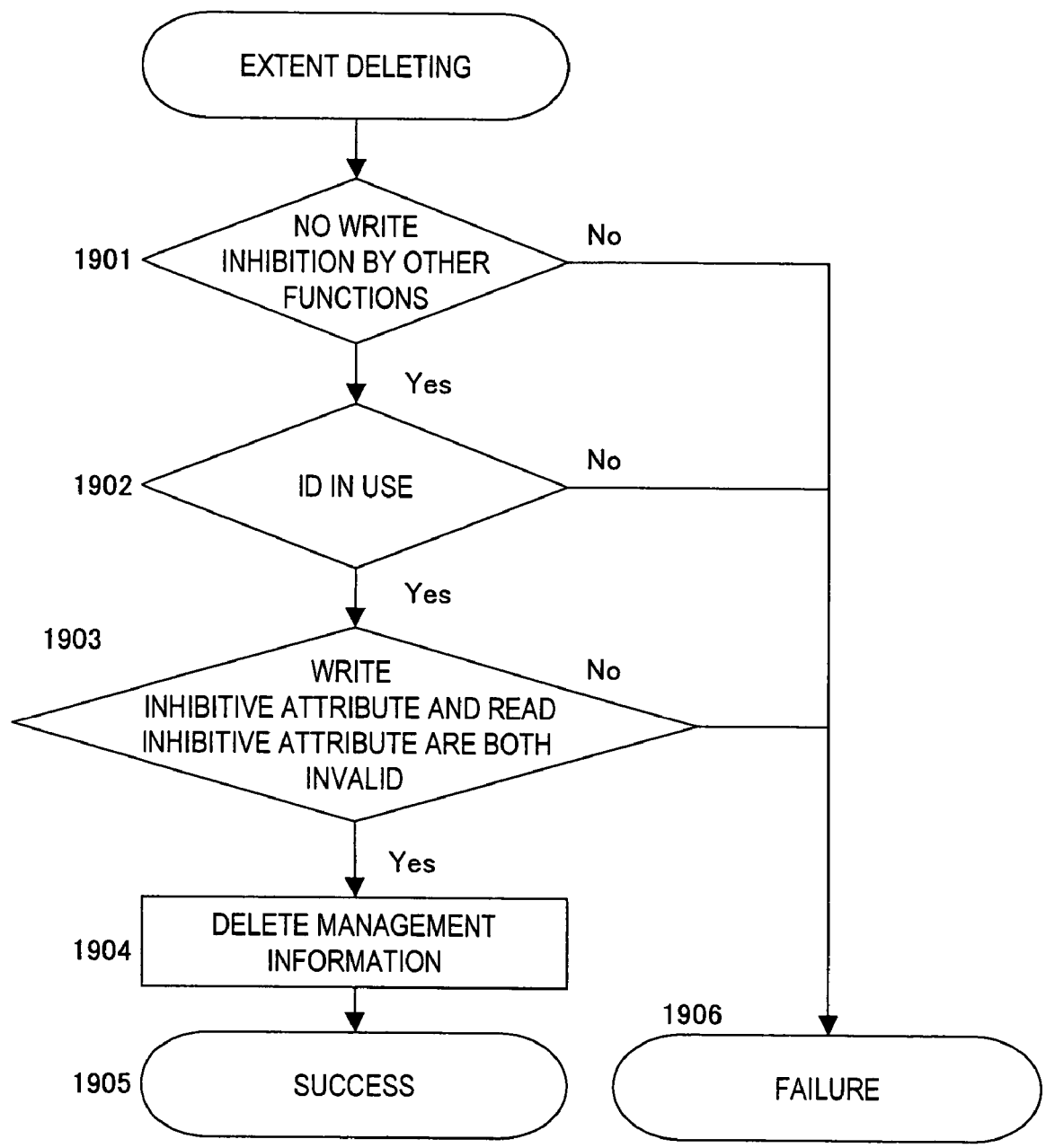
FIG. 19 is a flowchart of extent deleting processing executed by the extent management module according to the embodiment of this invention.

FIG. 19 is a flowchart of extent deleting processing executed by the extent management module 222 in this embodiment.

Detailed descriptions on steps in FIG. 19 similar to those of FIGS. 10 to 18 will be omitted.

The extent deleting processing is processing to delete a specific extent 307 set. Deletion of the extent 307 does not equal to deletion of data stored in the extent 307. Access control attributes set to this extent 307, on the other hand, are all lost through the extent deleting processing. Therefore, it is inhibited to delete an extent 307 to which a write inhibitive attribute or a read inhibitive attribute, or both are set.

The extent deleting processing is executed by the extent management module 222 when a command to delete a particular extent 307 (an extent deleting command) is received from the host 110A or from the management terminal 130.

The extent deleting command contains the identifier of the logical volume 226 that has the extent 307 to be deleted, and the extent ID 601 of this extent 307.

As reception of the extent deleting command starts the extent deleting processing, the extent management module 222 judges whether data write in the logical device 225 or the logical volume 226 that contains the extent 307 to be deleted is inhibited by other functions (1901).

When it is judged in the step 1901 that data write in this logical device 225 or logical volume 226 is inhibited by other functions, updating the volume management area 301 of the logical device 225 is not possible and accordingly the extent 307 cannot be deleted. The extent deleting processing thus fails (1906).

On the other hand, when it is judged in the step 1901 that data write in the logical device 225 and in the relevant logical volume 226 is not inhibited by any other function, the volume management area 301 of the logical device 225 can be updated.

Judged next is whether the extent ID 601 of the extent 307 that is to be deleted is in use or not (1902).

When it is judged in the step 1902 that the extent ID 601 is not in use, there is no extent 307 to delete. The extent deleting processing thus fails (1906).

On the other hand, when it is judged in the step 1902 that the extent ID 601 is in use, there is the extent 307 to be deleted.

Next, the attribute 602 of the extent 307 to be deleted is consulted to judge whether a write inhibitive attribute and read inhibitive attribute of this extent 307 are both "invalid" (1903).

When it is judged in the step 1903 that at least one of the write inhibitive attribute and the read inhibitive attribute is not "invalid", deleting this extent 307 is not allowed. The extent deleting processing thus fails (1906).

When it is judged in the step 1903 that the write inhibitive attribute and the read inhibitive attribute are both "invalid", this extent 307 can be deleted.

The management information is deleted next (1904). Specifically, the extent management information 306 associated with this extent 307 is deleted and the inside-volume extent management information 305 is updated.

The extent deleting processing now succeeds and is ended (1905). At this point, the extent management module 222 notifies the host 110A or the management terminal 130 that has issued the extent deleting command of the success of the extent deleting processing.

In the case where the extent deleting processing fails (1906), the extent management module 222 notifies the host 110A or the management terminal 130 that has issued the extent deleting command of the failure.

Figure 20:
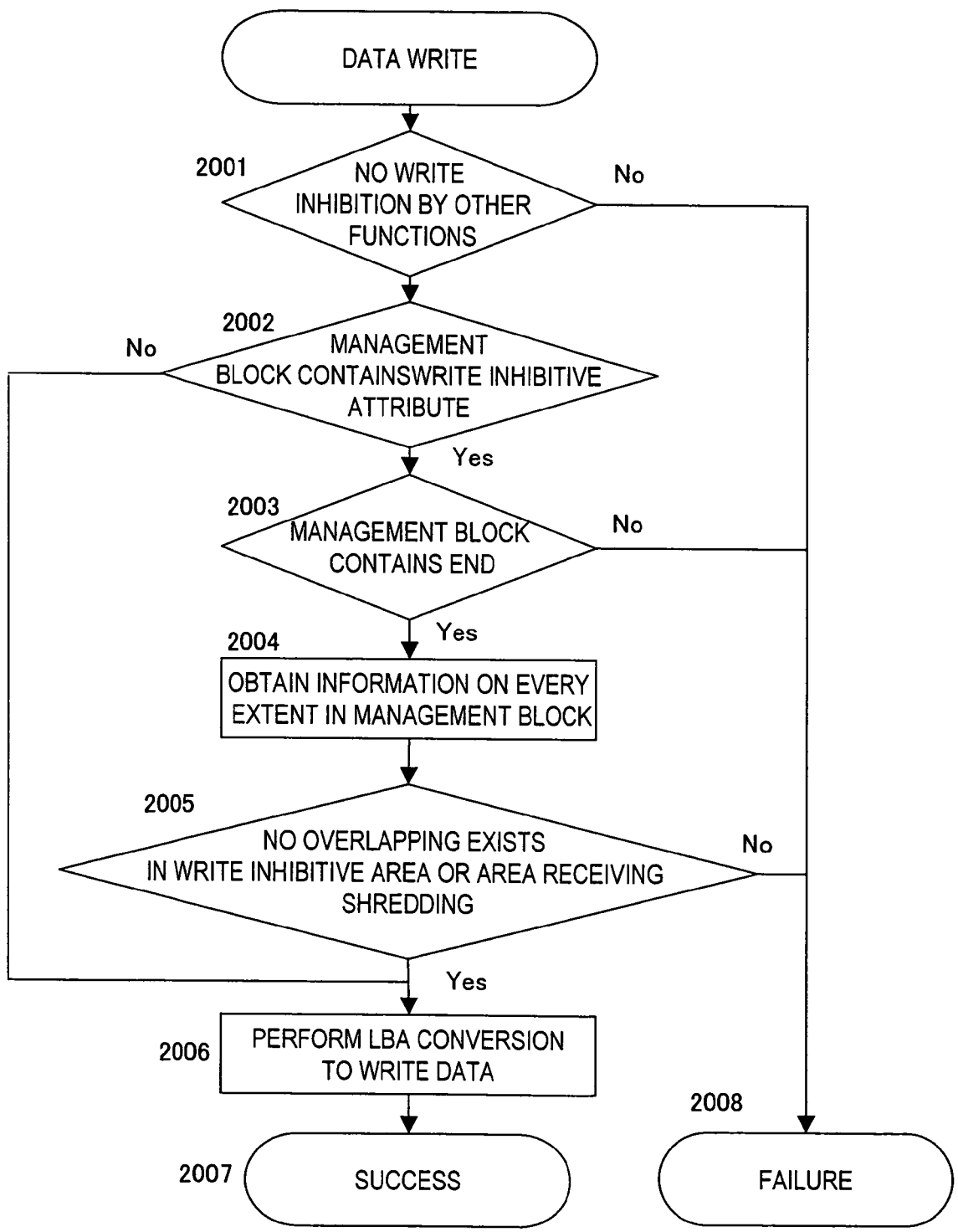
FIG. 20 is a flowchart of data write processing executed by an access control module according to the embodiment of this invention.

FIG. 20 is a flowchart of data write processing executed by the access control module 221 in this embodiment.

Detailed descriptions on steps in FIG. 20 similar to those of FIGS. 10 to 19 will be omitted.

The data write processing is processing to write data in the logical volume 226 and is executed by the access control module 221 when a command to write data (a write command) is received from the host 110A.

The write command contains data to be written upon this write command, the identifier of the logical volume 226 in which the data is to be written, and the location (external LBA) where the data is to be written.

As reception of the write command starts the data write processing, the access control module 221 judges whether data write in the logical volume 226 in which the data is to be written is inhibited by other functions (2001).

When it is judged in the step 2001 that data write in this logical volume 226 is inhibited by other functions, the data write processing fails (2008).

When it is judged in the step 2001 that data write in this logical volume 226 is not inhibited by any other function, the procedure advances to the next step to judge whether the management block 801 that contains a logical block in which the data is to be written (hereinafter referred to as "relevant management block 801") has any extent 307 to which a write inhibitive attribute is set (2002).

Specifically, the management block information bitmap 503 of the inside-volume extent management information 305 is consulted to judge whether the flag to indicate the presence or absence of a write inhibited area in the relevant management block 801 is "valid" or not. When this flag is "valid", it is judged that the relevant management block 801 has at least one extent 307 to which a write inhibitive attribute is set. When this flag is "invalid", it is judged that the relevant management block 801 has no extent 307 to which a write inhibitive attribute is set.

When it is judged in the step 2002 that the relevant management block 801 has no extent 307 to which a write inhibitive attribute is set, the data can be written in the relevant management block 801. The procedure thus proceeds to a step 2006.

On the other hand, when it is judged in the step 2002 that the relevant management block 801 has at least one extent 307 to which a write inhibitive attribute is set, the data cannot be written in the relevant management block 801 in some cases.

Judged next is whether the relevant management block 801 contains any end of the extent 307 or not (2003).

Specifically, the management block information bitmap 503 of the inside-volume extent management information 305 is consulted to judge whether the flag to indicate whether the relevant management block 801 contains any end of the extent 307 is "valid" or not. When this flag is "valid", it is judged that the relevant management block 801 contains at least one end of the extent 307. When this flag is "invalid", it is judged that the relevant management block 801 does not contain any end of the extent 307.

In the case where it is judged in the step 2003 that the relevant management block 801 does not contain any end of the extent 307, the extent 307 to which a write inhibitive attribute is set solely takes up the entirety of the relevant management block 801. Accordingly, the data cannot be written in the relevant management block 801 and the data write processing fails (2008).

On the other hand, in the case where it is judged in the step 2003 that the relevant management block 801 contains at least one end of the extent 307, the data can be written in the relevant management block 801 in some cases.

Then, information is obtained on every extent 307 that is contained in the relevant management block 801 (2004). Specifically, the extent management information 306 is looked up to retrieve the attribute 602, head external LBA 603 and extent length 604 of each extent 307 that is contained in the relevant management block 801. Obtained from the retrieved data are information about whether a write inhibitive attribute is set to the extent 307, information about whether the extent 307 is receiving shredding, and information on the area where the extent 307 is located.

The information obtained in the step 2004 is used to judge whether the logical block in which the data is to be written overlaps with the area of the extent 307 to which a write inhibitive attribute is set and whether the logical block overlaps with the area of the extent 307 that is receiving shredding (2005).

When it is judged in the step 2005 that the logical block in which the data is to be written overlaps with the area of the extent 307 to which a write inhibitive attribute is set, or overlaps with the area of the extent 307 that is receiving shredding, the data cannot be written in this logical block. The data write processing thus fails (2008).

On the other hand, when it is judged in the step 2005 that the logical block in which the data is to be written overlaps with neither the area of the extent 307 to which a write inhibitive attribute is set nor the area of the extent 307 that is receiving shredding, the data can be written in this logical block.

Then, the external LBA of the data to be written is converted into an internal LBA and the data is written at a location where the internal LBA indicates (2006).

The data write processing now succeeds and is ended (2007). At this point, the access control module 221 notifies the host 110A of the success of the data write processing.

In the case where the data write processing fails (2008), the access control module 221 notifies the host 110A of the failure.

Figure 21:
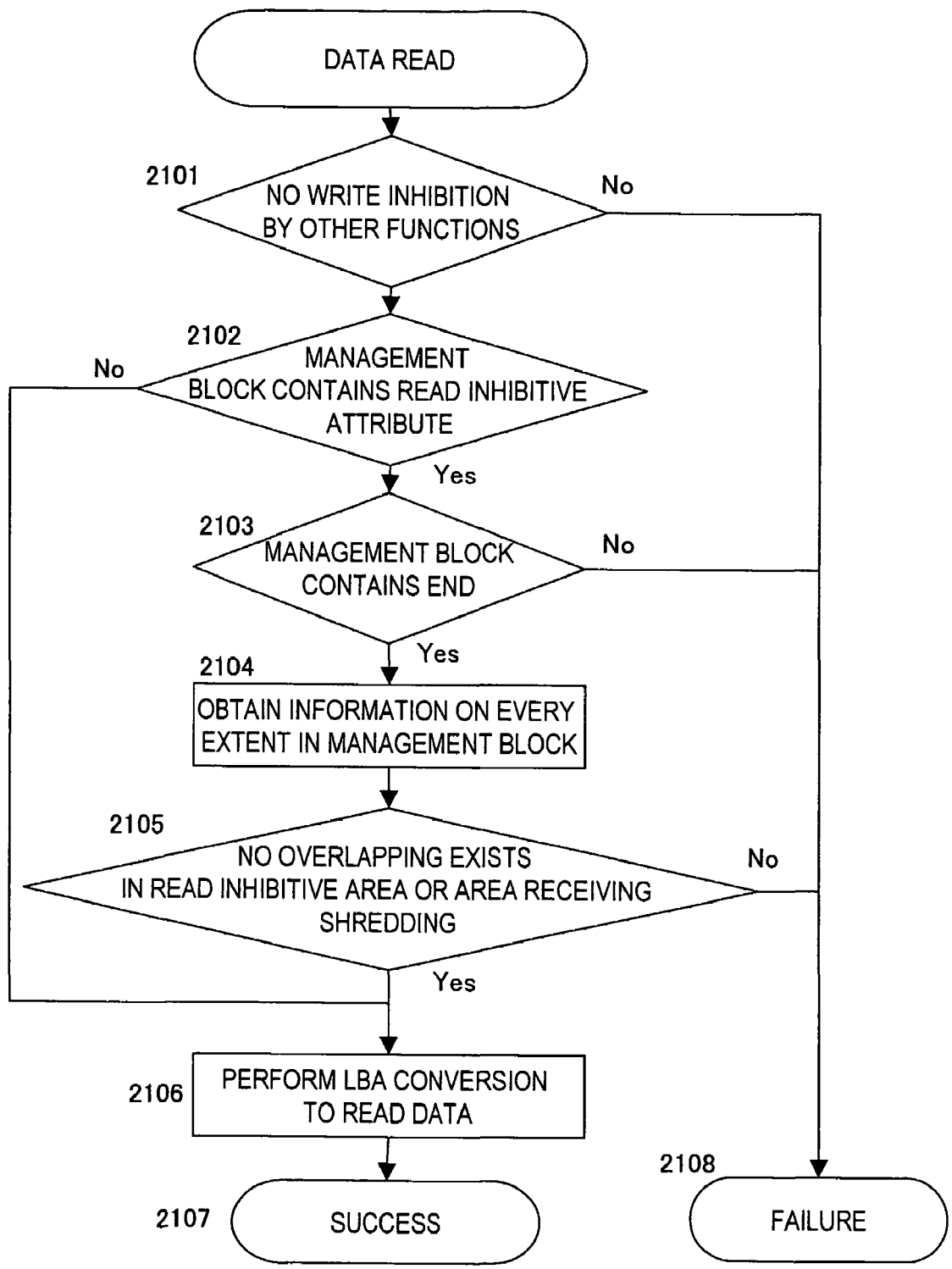
FIG. 21 is a flowchart of data read processing executed by the access control module according to the embodiment of this invention.

FIG. 21 is a flowchart of data read processing executed by the access control module 221 in this embodiment.

The data read processing runs through steps similar to those of the data write processing shown in FIG. 20.

The data read processing is processing to read data in the logical volume 226 and is executed by the access control module 221 when a command to read data (a read command) is received from the host 110A.

The read command contains the identifier of the logical volume 226 that contains data to be read upon this read command, and the location (external LBA) where the data is written.

As reception of the read command starts the data read processing, the access control module 221 judges whether data read in the logical volume 226 from which the data is to be read is inhibited by other functions (2101).

When it is judged in the step 2101 that data read in this logical volume 226 is inhibited by other functions, the data read processing fails (2108).

When it is judged in the step 2101 that data read in this logical volume 226 is not inhibited by any other function, the procedure advances to the next step to judge whether the management block 801 that contains a logical block from which the data is to be read (hereinafter referred to as "relevant management block 801") has any extent 307 to which a read inhibitive attribute is set (2102).

Specifically, the management block information bitmap 503 of the inside-volume extent management information 305 is consulted to judge whether the flag to indicate the presence or absence of a read inhibited area in the relevant management block 801 is "valid" or not. When this flag is "valid", it is judged that the relevant management block 801 has at least one extent 307 to which a read inhibitive attribute is set. When this flag is "invalid", it is judged that the relevant management block 801 has no extent 307 to which a read inhibitive attribute is set.

When it is judged in the step 2102 that the relevant management block 801 has no extent 307 to which a read inhibitive attribute is set, the data can be read out of the relevant management block 801. The procedure thus proceeds to a step 2106.

On the other hand, when it is judged in the step 2102 that the relevant management block 801 has at least one extent 307 to which a read inhibitive attribute is set, the data cannot be read out of the relevant management block 801 in some cases.

Judged next is whether the relevant management block 801 contains any end of the extent 307 or not (2103).

Specifically, the management block information bitmap 503 of the inside-volume extent management information 305 is consulted to judge whether the flag to indicate whether the relevant management block 801 contains any end of the extent 307 is "valid" or not. When this flag is "valid", it is judged that the relevant management block 801 contains at least one end of the extent 307. When this flag is "invalid", it is judged that the relevant management block 801 does not contain any end of the extent 307.

In the case where it is judged in the step 2103 that the relevant management block 801 does not contain any end of the extent 307, the extent 307 to which a read inhibitive attribute is set solely takes up the entirety of the relevant management block 801. Accordingly, the data cannot be read out of the relevant management block 801 and the data read processing fails (2108).

On the other hand, in the case where it is judged in the step 2103 that the relevant management block 801 contains at least one end of the extent 307, the data can be read out of the relevant management block 801 in some cases.

Then, information is obtained on every extent 307 that is contained in the relevant management block 801 (2104). Specifically, the extent management information 306 is looked up to retrieve the attribute 602, head external LBA 603 and extent length 604 of each extent 307 that is contained in the relevant management block 801. Obtained from the retrieved data are information about whether a read inhibitive attribute is set to the extent 307, information about whether the extent 307 is receiving shredding, and information on the area where the extent 307 is located.

The information obtained in the step 2104 is used to judge whether the logical block from which the data is to be read overlaps with the area of the extent 307 to which a read inhibitive attribute is set and whether this logical block overlaps with the area of the extent 307 that is receiving shredding (2105).

When it is judged in the step 2105 that the logical block from which the data is to be read overlaps with the area of the extent 307 to which a read inhibitive attribute is set, or overlaps with the area of the extent 307 that is receiving shredding, the data cannot be read out of this logical block. The data read processing thus fails (2108).

On the other hand, when it is judged in the step 2105 that the logical block from which the data is to be read overlaps with neither the area of the extent 307 to which a read inhibitive attribute is set nor the area of the extent 307 that is receiving shredding, the data can be read out of this logical block.

Then, the external LBA of the data to be read is converted into an internal LBA and the data is read from a location where the internal LBA indicates (2106).

The data read processing now succeeds and is ended (2107). At this point, the access control module 221 notifies the host 110A of the success of the data read processing.

In the case where the data read processing fails (2108), the access control module 221 notifies the host 110A of the failure.

According to this invention described above, areas (extents) of a desired size are set in a logical volume and an attribute such as a write inhibitive attribute is set to each of the extents separately. A storage system can thus be utilized to its fullest capacity.

Furthermore, this invention divides a logical volume into management blocks of a predetermined size and gives each management block a flag that indicates such information regarding whether the management block has any extent. By referring to the flag, it can be readily judged whether it is possible to perform a particular processing such as data write on a particular management block.

What is claimed is:

1. A storage system coupled to a computer via a network, comprising:
   a logical volume in which data is stored; and
   a control device which controls access to the data stored in the logical volume,
   wherein a first area of a desired size is set in the logical volume, the first area having first access control attributes, said area being defined by an address, wherein a second area of a predetermined size is set in the logical volume, the second area including second access control attributes based on the first access control attributes, wherein, upon receiving an access request made by the computer to perform access to the logical volume, the control device:

performs the access in the case where the second area, which contains the area designated by the access request, does not contain any part of the first area whose first access control attributes inhibit the type of access requested by reference to the second access control attributes, determines the first access control attributes in the case where the second area, which contains the area designated by the access request, contains any part of the first area whose first access control attributes inhibit the type of access requested by reference to the second access control attributes, notifies the computer that the control device does not perform the access in the case where the first area, whose first access control attributes inhibit the type of the requested access, solely takes up the entirety of the second area which contains the area designated by the access request by reference to second access control attributes, and wherein, upon receiving an access request made by the computer to perform shredding to an area included in the logical volume, the control device notifies the computer that the control device does not perform the shredding when the area designated by the access request includes at least a part of the first area and the first access control attributes set to the first area either inhibit write access or inhibit shredding, wherein the request to perform shredding includes an identifier of the first area, and wherein the request to perform shredding includes a shredding pattern to be used during shredding.

2. The storage system according to claim 1,
wherein, upon receiving a creating request to create a requested area in the logical volume, the control device notifies that the control device does not create the requested area when the requested area is judged to overlap with the first area that has been set in the logical volume.

3. The storage system according to claim 2,
wherein a second area of a predetermined size is set in the logical volume,
wherein, upon receiving the creating request, the control device
creates the requested area when the second area, which contains an area where the requested area is requested to be created, does not contain the first area that has been set in the logical volume, and
notifies that the control device does not create the requested area when the existing first area that has been set in the logical volume solely takes up the entirety of the second area which contains the area where the requested area is to be created.

4. The storage system according to claim 1,
wherein, upon receiving a setting request to set the first access control attributes to the first area and a first access control attribute set period during which the first access control attributes requested to set are kept set, the control device
compares the first access control attribute set period of the setting request against a second access control attribute set period that has already been set to the first area designated by the setting request, and
notifies that the control device does not set the requested first access control attributes when the first access control attribute set period of the setting request elapses before the expiration of the second access control attribute set period that has already been set to the first area designated by the setting request.

5. The storage system according to claim 1,
wherein, upon receiving a removing request to remove a particular access control attribute set to the first area, the control device:
judges whether a particular access control attribute set period of the particular access control attribute designated by the removing request has expired or not, and
notifies that the control device does not remove the particular access control attribute designated by the removing request when judging that the particular access control attribute set period of the particular access control attribute designated by the removing request has not expired yet.

6. The storage system according to claim 1,
wherein, upon receiving a reference request to refer to a particular access control attribute set to the first area, the control device sends information on the particular access control attribute designated by the reference request and, when a particular access control attribute set period of this particular access control attribute has not expired yet, sends a flag indicating that this particular access control attribute cannot be changed.

7. The storage system according to claim 1,
wherein, upon receiving a deleting request to delete a first area set in the logical volume, the control device:
judges whether or not a particular access control attribute that inhibits access is set to the first area designated by the deleting request, and
notifies that the control device does not delete the first area designated by the deleting request when judging that the particular access control attribute that inhibits access is set to the first area designated by the deleting request.

8. A method of controlling a storage system which is coupled to a computer via a network and which comprises a logical volume to store data and a control device to control access to the data in the logical volume, the logical volume having a first area of a desired size, the first area having a first access control attribute and being defined by an address, the logical volume also having a second area of a predetermined size, the second area having a second access control attribute based on the first access control attribute, the method comprising the steps of:
receiving an access request made by the computer to perform access to the logical volume;
performing the access in the case where the second area, which contains the requested area designated by the access request, does not contain any part of the first area whose first access control attribute inhibits the type of access requested;
determines the first access control attribute in the case where the second area, which contains the area designated by the access request, contains any part of the first area whose first access control attribute inhibits the type of access requested by reference to the second access control attribute; and
notifying the computer that the access is not performed in the case where the first area whose first access control attribute inhibits the type of the requested access solely takes up the entirety of the second area which contains the requested area designated by the access request by reference to the second access control attribute, and wherein, upon receiving an access request made by the computer to perform shredding to an area included in the logical volume, notifying the computer that shredding is not performed when the area designated by the access request includes at least a part of the first area and the first access control attribute set to the first area either inhibits write access or inhibits shredding, wherein the request to perform shredding includes an identifier of the first area, and wherein the request to perform shredding includes a shredding pattern to be used during shredding.

9. The control method according to claim 8, further comprising the step of:

notifying that requested area which is requested to be created by a received creating request is not created when the requested area is judged to overlap with the first area that has been set in the logical volume.

10. The control method according to claim 9, further comprising the steps of:

creating the requested area when a second area, which is set in the logical volume to have a predetermined size and which contains an area where the requested area is to be created, does not contain the first area that has been set in the logical volume; and notifying that the requested area is not created when the first area that has been set in the logical volume solely takes up the entirety of the second area which contains the area where the requested area is to be created.

11. The control method according to claim 8, further comprising the steps of:

comparing a second access control attribute set period, which is related to a received setting request to set a particular access control attribute to the first area, against a first access control attribute set period that has already been set to the first area designated by the setting request; and notifying that the particular access control attribute is not set when the second access control attribute set period of the setting request elapses before the expiration of the first access control attribute set period that has already been set to the first area designated by the setting request.

12. The control method according to claim 8, further comprising the steps of:

judging whether an access control attribute set period of a particular access control attribute designated by a received removing request to remove the particular access control attribute set to the first area has expired or not; and notifying that the particular access control attribute designated by the removing request is not removed when it is judged that the access control attribute set period of the particular access control attribute designated by the removing request has not expired yet.

13. The control method according to claim 8, further comprising the step of:

sending information on a particular access control attribute designated by a received reference request to refer to the particular access control attribute set to the first area and, when a access control attribute set period of the particular access control attribute has not expired yet, sending a flag indicating that the particular access control attribute cannot be changed.

14. The control method according to claim 8, further comprising the steps of:

judging whether or not a particular access control attribute set to the first area designated by a received deleting request to delete a first area set in the logical volume inhibits access; and notifying that the first area designated by the deleting request is not deleted when it is judged that the particular access control attribute set to the first area designated by the deleting request inhibits access.

15. The storage system according to claim 1, wherein storage system receives a first command to create the first area of the desired size in the logical volume, the first area being defined by a logical block address, the storage system then receives a second command to set a write inhibitive attribute to the first area created by the first command, and to set a period during which the write inhibitive attribute is kept set, and in the case where the access request to write data in the first area is received before the period set by the second command expires, the storage system notifies that the requested data write is not performed.

16. The control method according to claim 8, further comprising the steps of:

receiving a first command to create the first area of the desired size in the logical volume, the first area being defined by a logical block address; and receiving a second command to set a write inhibitive attribute to the first area created by the first command, and to set a period during which the write inhibitive attribute is kept set, wherein the step of notifying includes notifying, in the case where the access request to write data in the first area is received before the period set by the second command expires, that the requested data write is not performed.

17. A storage system coupled to a computer via a network, comprising:

a logical volume in which data is stored; and a control device which controls access to the data stored in the logical volume, wherein a first area of a desired size is set in the logical volume, the first area having access control attributes set thereto for both a read access and a write access, said area being defined by a logical block address, wherein, upon receiving an access request made by the computer to perform access to the logical volume, the control device notifies the computer that the control device does not perform the access when an area designated by the access request contains at least a part of the first area and the access control attributes set to the first area inhibit the type of the access requested, wherein, upon receiving an access request made by the computer to perform shredding to an area included in the logical volume, the control device notifies the computer that the control device does not perform the shredding when the area designated by the access request includes at least a part of the first area and the access control attributes set to the first area either inhibit write access or inhibits shredding, and wherein the request to perform shredding includes an identifier of the first area; and wherein the request to perform shredding includes a shredding pattern to be used during shredding.

18. The storage system according to claim 17, wherein, upon receiving a write request made by the computer to perform writing of data in an area included in the logical volume, the control device notifies the computer that the control device does not perform the writing when the area designated by the write request includes at least a part of the first area that is in the process of shredding and the access control attributes set to the first area inhibit writing during the process of shredding, and, wherein, upon receiving a read request made by the computer to perform reading of data in an area included in the logical volume, the control device notifies the computer that the control device does not perform the reading when the area designated by the read request includes at least a part of the first area that is in the process of shredding and the access control attributes set to the first area indicate that the first area inhibits reading during the process of shredding.

19. A storage system according to claim 1, wherein. the first area has first access control attributes set thereto for both a read access and a write access, said area being defined by a logical block address, upon receiving the access request made by the computer to perform access to the logical volume, the control device notifies the computer that the control device does not perform the access when an area designated by the access request includes at least a part of the first area and the first access control attributes set to the first area indicate that the first area inhibits the type of the access requested, and the first area includes volume management area which contains information for managing the logical volume.

20. The storage system according to claim 19, wherein the first area includes a plurality of blocks, wherein an internal block address is assigned to each of the plurality of blocks in the first area to identify each block, wherein an external block address is assigned to each of the plurality of blocks in the first area except for the blocks included in the volume management area, and wherein the control device converts the external block address into the internal block address when the control device receives the access request to access a block in the logical volume by designating the external block address assigned to the block which is to be accessed.

21. The storage system according to claim 19, wherein the volume management area contains information indicating the first access control attributes set to the first area in the logical volume.

22. The storage system according to claim 1, wherein the control device determines which type of access should be performed by:

judging whether the first access control attributes inhibit the type of access requested, and if so, judging whether the second area, which contains the area designated by the access request, includes any part of the first area or whether the second area is entirely included in the first area.

* * * * *